INVENTORS A. E. GERBORE
R. A. PLYER
W. C. STEGER, JR.
BY F. A. McCorkindale
ATTORNEY July 30, 1963 A. E. GERBORE ETAL 3,099,719

PRIVATE BRANCH EXCHANGE TELEPHONE SYSTEM INCLUDING CONFERENCE FACILITIES

Filed Dec. 8, 1961 13 Sheets-Sheet 2

July 30, 1963 A. E. GERBORE ETAL 3,099,719

PRIVATE BRANCH EXCHANGE TELEPHONE SYSTEM INCLUDING CONFERENCE FACILITIES

Filed Dec. 8, 1961 13 Sheets-Sheet 3

July 30, 1963 A. E. GERBORE ETAL 3,099,719

PRIVATE BRANCH EXCHANGE TELEPHONE SYSTEM
INCLUDING CONFERENCE FACILITIES

Filed Dec. 8, 1961 13 Sheets-Sheet 6

July 30, 1963 A. E. GERBORE ETAL 3,099,719

PRIVATE BRANCH EXCHANGE TELEPHONE SYSTEM INCLUDING CONFERENCE FACILITIES

Filed Dec. 8, 1961 13 Sheets-Sheet 12

United States Patent Office 3,099,719
Patented July 30, 1963

3,099,719
PRIVATE BRANCH EXCHANGE TELEPHONE SYSTEM INCLUDING CONFERENCE FACILITIES

Alexander E. Gerbore, Lynbrook, N.Y., Roger A. Plyer, San Rafael, Calif., and William C. Steger, Jr., Des Plaines, Ill., assignors to Bell Telephone Laboratories, Incorporated, New York, N.Y., a corporation of New York Filed Dec. 8, 1961, Ser. No. 158,027
8 Claims. (Cl. 179—27.02)

This invention relates to a private branch exchange telephone system and more particularly to a private branch exchange telephone system which includes conference facilities.

In instances where a telephone customer, for example a business firm, a Government agency, or the like requires a relatively large number of extensions, it is the usual practice to provide on the premises, or conveniently located thereto, a private branch exchange commonly referred to as a PBX. The larger PBX's are usually served by one or more attendants from a console or attendant's position and function essentially as a small telephone central office in that intrastation calls between extensions on the premises are completed through the PBX as well as calls from the extensions to subscribers served through remote central offices and calls from such subscribers to extensions served by the PBX. A PBX of a type capable of serving a relatively large number of extensions and providing many advanced features is disclosed in Patent 2,904,637, issued September 15, 1959, to R. D. Williams.

It is fairly common practice to provide in connection with the PBX, conference facilities by means of which several of the extension stations may be connected together in a common loop for communication with each other and, on occasion, such a conference setup may be connected to an outside line through the PBX. It is desirable, of course, that subscribers joined in these conference calls be provided the same high quality transmission as that prevailing in the instance of two-party connections and, further, that the provision of the conference facilities does not interfere with or reduce the availability of the lines for ordinary connections.

Accordingly, it is an object of our invention to improve the operation of private branch exchange telephone systems.

Another object of the invention is to enhance and improve conference facilities associated with a private branch exchange.

A still further object of the invention is to visually identify lines associated with a conference connection at any given moment.

In accordance with a specific embodiment of our invention, wherein a plurality of four-wire lines may be interconnected as desired under control of an attendant, two conference bridges are provided each having a capacity of five lines. Independent conference connections can be set up on the two bridges under control of the attendant, each conference connection having a maximum capacity of five lines; the respective conference bridges can be connected to outside lines if desired. In accordance with the novel arrangement contemplated by the invention, the two conference bridges can, on occasion, be connected in tandem whereby to provide a single conference connection with a capability of ten lines.

A feature of our invention is resistance bridges used for connecting lines in a conference loop whereby to attain high quality transmission substantially free of echo effects.

A further feature of the invention is means for connecting desired lines to each of a pair of conference bridges and to connect said bridges in tandem whereby to provide a common conference connection of relatively large capacity.

A still further feature of the invention is means effective upon disconnection from either respective tandemly-connected bridge of all the station lines connected thereto to interrupt said tandem connection and restore the respective bridges to independent status.

Yet another feature of our invention is means controlled by a single key operation and effective at any time while a conference is in progress for identifying all lines associated with a conference bridge.

A full understanding of the arrangement contemplated by the present invention as well as an appreciation of the various features thereof may be gained from consideration of the following detailed description in connection with the accompanying drawing, in which.

*General Description*

Figure 1:
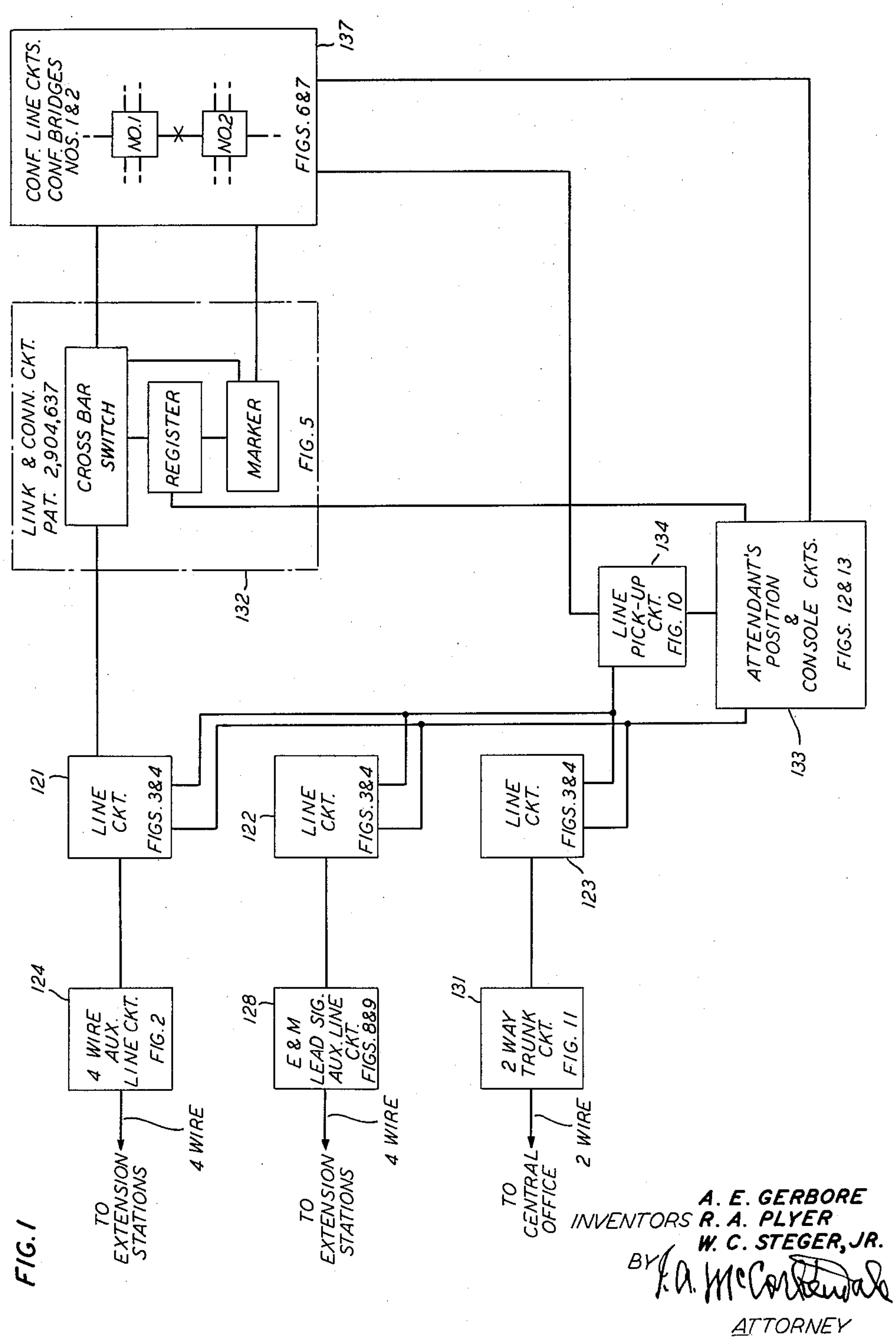
FIG. 1 shows schematically the relationship of the various individual circuits which comprise one specific illustrative embodiment of the private branch exchange system contemplated by the invention.
Figures 2, 14:
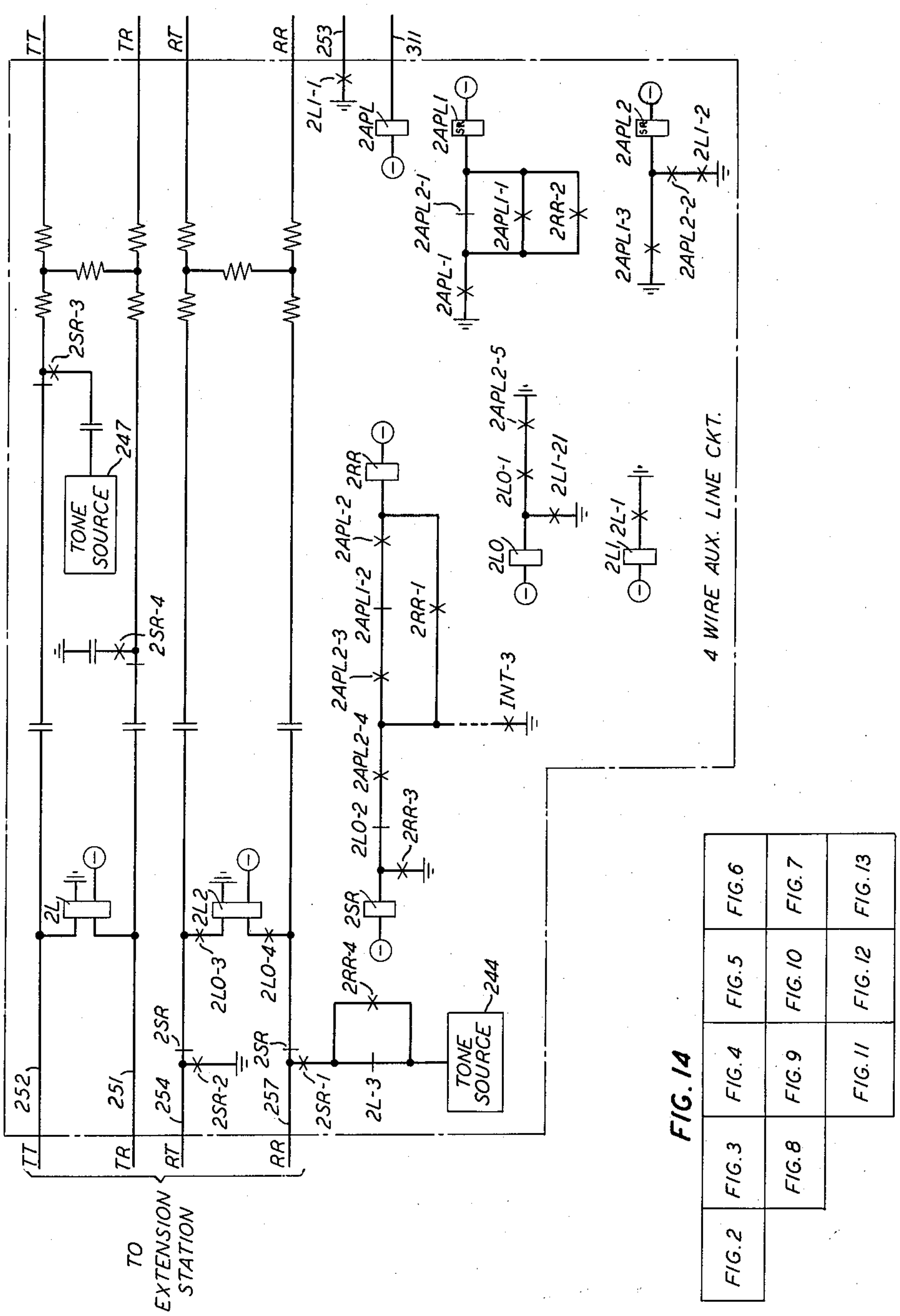
FIG. 2 shows the four-wire auxiliary line circuit.
FIG. 14 shows the manner in which certain of the figures should be arranged to show the specific illustrative embodiment of the invention.

The arrangement and operation of the various components of the illustrative embodiment of the invention will be described in detail subsequently with reference to FIGS. 2 to 14, inclusive. However, in order to first gain a general overall understanding of the arrangement contemplated, a brief general description will be given at this point with reference to FIG. 1. Referring, therefore, to FIG. 1 it will be noted that the two groups of four-wire extension stations, and the central office are all connected to the PBX over different paths, all of which include similar line circuits 121, 122 and 123 (FIGS. 3 and 4) but each of which includes a different type of intermediate circuit. For example, the first group of four-wire extension stations is connected through four-wire auxiliary line circuit 124 (FIG. 2). This circuit, which will be described in detail subsequently, recognizes "off-hook" and "on-hook" signals from the station and passes them along to line circuit 121, recognizes an incoming call from line circuit 121 and applies machine ringing current to the station loop, and recognizes the "answer" condition at the station and removes the ringing current from the loop.

Another group of four-wire stations is connected to the associated line circuit 122 through auxiliary line circuit 128 which is used with "E" and "M" signaling. Circuit 128 provides functions similar to that of auxiliary line circuit 124 by way of carrier or other facilities utilizing "E" and "M" lead signaling.

The central office connection is made over a two-wire line to two-way trunk circuit 131. This circuit functions to recognize seizure from the central office and to pass this seizure along to line circuit 123, to recognize seizure from line circuit 123 and to pass this seizure along to the central office, and to provide a hybrid arrangement whereby to convert from four-wire to two-wire operation.

Respective line circuits 121, 122 and 123 each have three access points. Toward the lines it connects to an auxiliary line circuit (circuits 124, 128, or 131) which receives line signals and translates them for use in the line circuit. Toward the automatic switching mechanism it connects to the links of link and connector circuit 132. Access from the links is used for terminating calls to this line circuit and to extend calls to other lines from this circuit. A third access is provided for the attendant, i.e., to attendant's position and console circuits 133. This access is provided with call progress lamps and a busy lamp. It is used by the attendant to answer incoming calls and to extend these calls to other lines by way of the links. It is also used to gain access to any line at any time, whether busy or idle, for originating a call, answering a call, disconnecting an established call or monitoring. Some of the general functions of each line circuit are to recognize seizure incoming and to signal the attendant, to recognize seizure outgoing and to light a busy lamp, to recognize seizure by the attendant and light a busy lamp, to make itself busy when seized by the attendant or the automatic switching circuits, and to exchange supervision between connected line circuits and the attendant.

Line pickup circuit 134 is included in the path over which the line circuits are connected to the attendant's position and console circuits 133; the circuit functions to connect leads of a respective line circuit to the position circuit, to prevent the simultaneous connection of the position circuit to more than one line circuit, to prevent two position circuits from being connected to the same line circuit, and to release the connection when a subsequent line is selected or upon receipt of a release signal from the attendant.

The functions of the attendant's position and console circuits have been briefly discussed above in connection with the line circuits. In general, the console circuit provides the keys, lamps, jacks, headset, handset and dial for the attendants. The design of the console per se may be as disclosed in United States Patent Des. 193,513, issued September 4, 1962, on the application of F. P. Wight, Serial No. 67,038, filed October 10, 1961. The position circuit includes a suitable four-wire resistance bridge arrangement to permit a three-way conversation while maintaining adequate transmission levels.

Among the signal lamps included in the console circuit are a Source lamp for each line and a Destination lamp, also one for each line. The source lamps are the supervisory lamps for the calling stations and the destination lamps are the supervisory lamps for the called stations. The operation of typical source and destination lamps will be described subsequently in connection with the detailed circuit description. The indications given by each are as follows.

Source lamp indications:

(1) Dark—calling station on-hook.
(2) 120 i.p.m. "flash"—incoming call.
(3) Lighted "steady"—calling station off-hook and answered by attendant.
(4) 30 i.p.m. "flash"—(with Pickup key operated) attendant has called and is awaiting called station answer.

Destination lamp indications:

(1) Dark—connection to the called station has not been established or the station has gone on-hook.
(2) 30 i.p.m. "flash"—awaiting off-hook signal from called station to line.
(3) Lighted "steady"—called station is off-hook.
(4) 120 i.p.m. "flash"—called station recalling attendant.

As mentioned above and as will be described in detail subsequently, the arrangement contemplated by our invention includes novel conference facilities. The conference line circuits and associated conference bridges, No. 1 and No. 2 are indicated by rectangle 137. Each bridge is provdied with six legs, five of the legs being provided for connection of selected lines to the respective bridge and the sixth leg of each bridge being utilized on occasion for interconnection of the two bridges in tandem. Each of the conference bridges, No. 1 and No. 2, comprises a six-leg resistance bridge of the general arrangement disclosed in H. A. Rhodes Patent 2,755,445, issued July 17, 1956. When the atendant has ascertained the station lines to be associated with a conference, she will first originate a call to the first line, in a manner to be described in detail subsequently, and then will by direct station selection connect the line to one leg of the conference line circuit. This action will be repeated until all the desired lines (five or less) have been connected to the respective bridge.

The two bridges may be used independently and will ordinarily be so used so long as neither conference includes more than five lines, the maximum capacity of each bridge. In the event a larger conference (up to ten lines) is desired, the novel arrangement provided is such that by a single key operation by the attendant the two bridges may be connected in tandem whereby to permit a single conference connection with a capability of ten lines. Substantially distortionless transmission is attained for the conference circuit through use of the two balanced resistance coupling structures and the novel utilization of one of the legs of each for the interconnection of the two. By a further novel means, the tandem connection of the two bridges is automatically interrupted if all lines connected to either bridge go "on-hook" and the two bridges are restored to independent status. Also, during the conference connection all lines associated with a conference bridge, or bridges, can be identified by a single key operation by the attendant.

It will be apparent from the above brief description, and still more apparent from the subsequent detailed description, that a novel and effective conference arrangement is provided whereby a conference connection of relatively large capacity may be established on occasion, and yet where the flexibility and other advantages of smaller capacity, individual conference connections are not permanently sacrificed.

It will be apparent, of course, that when the two bridges have been connected in tandem, neither should be permitted to "hang idle," that is, if all the lines connected to either bridge go on-hook the tandem connection should be interrupted without undue delay and the bridges restored to independent status so that the idle bridge may be available for further use. The restoring means referred to above accomplishes this desirable objective entirely automatically and without any monitoring actions on the part of the attendant.

"Direct Station Selection" referred to above is an arrangement recently provided in certain PBX installations whereby the attendant may complete a call to an extension station merely by operation of the "DSS" key for that station, maintaining it operated until the associated "DSS" lamp lights, and then releasing it. Operation of the DSS key generates the tens and units information corresponding to the called extension and transmits the information to the dial pulse register in a manner similar to that prevailing in dial operation. One type of direct station selection is disclosed in United States Patent 3,050,588, issued August 21, 1962, on the application, "Registration Control Circuit," Serial No. 645, filed January 5, 1960, M. L. Benson and C. Breen.

*Incoming Call From Extension Station*

Referring now to FIGS. 2 to 13 of the drawing, a more detailed description of the contemplated arrangement will be given. It will be noted that the illustrated system utilizes a four-wire line with "transmit" and "receive" loops and that, at points where the lines are coupled by repeat coils, simplex paths are obtained for signaling and supervision purposes by midcoil connections in the well-known manner. It will be assumed first that an incoming call originates at a four-wire extension station connected to four-wire auxiliary line circuit 124 (FIGS. 1 and 2). When the extension station (not shown) originates a call by going off-hook, the closed TT—TR loop operates relay 2L over an obvious path which includes leads 251 and 252 and the two windings of the relay. Talking battery is supplied to the station from relay 2L over leads 251 and 252. Relay 2L, operated, completes through its 2L–1 make contact an obvious operating path for relay 2L1. Upon operation of relay 2L1, ground is connected through its 2L1–1 make contact to lead 253 as an off-hook signal to the line circuit.

Relay 2L1, operated, also completes through its 2L1–21 make contact an operating path for relay 2L0 (FIG. 2). Relay 2L0, upon operating, partially completes a locking path through its 2L0–1 make contact and opens at its 2L0–2 break contact the operating path of relay 2SR. Relay 2L0, operated, also connects through its 2L0–3 and 2L0–4 make contacts the windings of relay 2L2 to the T–R station receive loop, leads 254 and 257.

The ground applied to lead 253 by operation of relay 2L1, as above described, operates relay 3LL (FIG. 3) over an obvious path which includes break contact 3RV–1 of relay 3RV. Operation of relay 3LL in turn completes through its make contact 3LL–1 an operating path for slow-release relay 3LL1. With relay 3LL1 operated, interrupted battery is applied through interrupter contact INT–1 (FIG. 4), make contact 3LL1–1 of relay 3LL1, break contacts 4AC–1 of relay 4AC and 4ACA–1 of relay 4ACA to "source lamp" lead 458 (SL00) to source lamp 1259 ("S00") at the attendant's position (FIG. 12); lamp 1259 is "flashed" at 120 i.p.m., the rate at which the battery is interrupted, whereby to attract the attention of the attendant to the incoming call.

It will be understood, of course, that there is an individual source lamp (as well as individual destination lamps, pickup lamps and so on) for each line served by the PBX and that individual control paths are provided for each. However, for purpose of simplification and clarity, there will be actually shown only typical ones (usually the first and last of the series) of these duplicated elements, and dot-dash lines with brackets will be utilized in an obvious manner to indicate the simulation of a group of similar leads and of the carrying over of such groups from one point to another.

Figure 12:
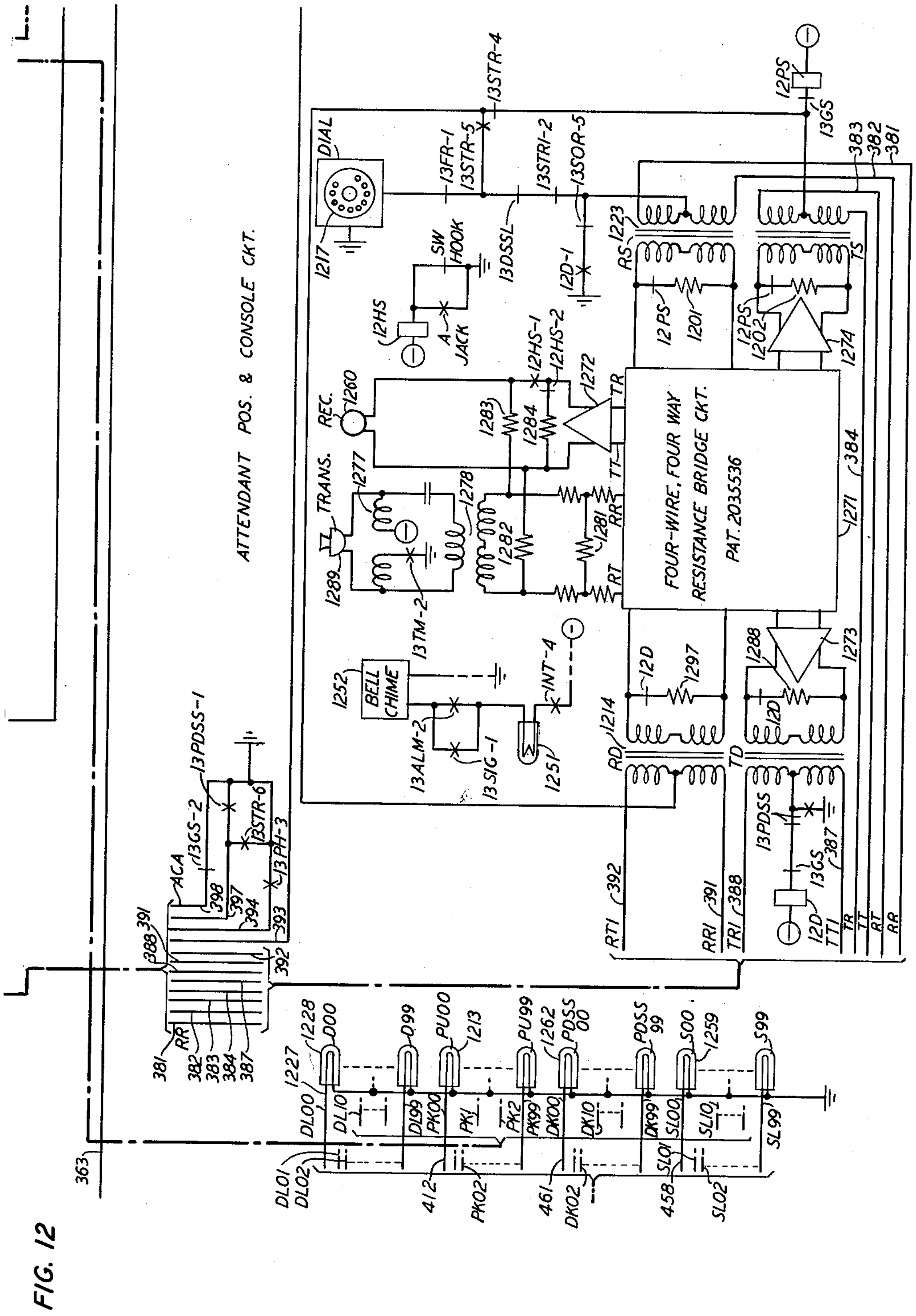
FIGS. 12 and 13 show the attendant's position and console circuits.
Figure 13:
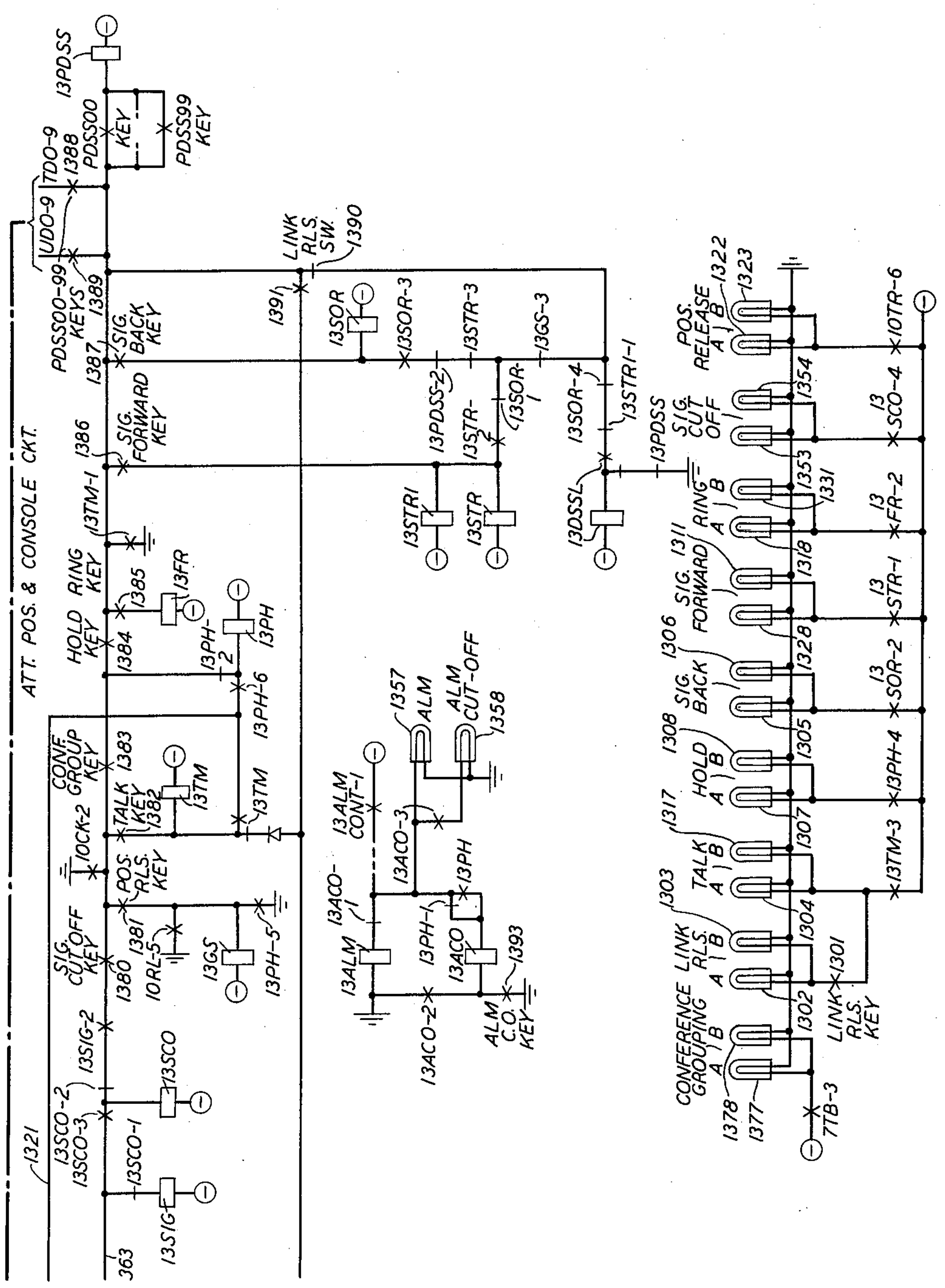

Also, relay 3LL1 operating as above described, connects negative potential to lead 461 (DK00) over its 3LL1–2 make contact and break contact 4H–1 of relay 4H whereby to light direct station selection lamp 1262 (PDSS00) at "steady," lamp 1262 being located at the attendant's position (FIG. 12). Relay 3LL1, upon operating, also connects ground through its make contact 3LL1–3 (FIG. 3) and break contacts 4LH–1 of relay 4LH, 4ACA–2 of relay 4ACA, 4L1D–1 of relay 4L1D, 4H–2 of relay 4H and 4ATT–1 and 4ATT–2 of relay 4ATT to lead 363 and thereover to battery on the winding of relay 13SIG (FIG. 13) of the console circuit. Operation of relay 13SIG causes an audible signal to sound as will be described subsequently.

*Attendant Responds to Call*

The attendant, being alerted by the audible signal referred to and the flashing source lamp 1259 (FIG. 12) to the call originated at the extension station, operates the particular pickup key in the console circuit for the calling line; this causes the line pickup circuit (FIG. 10) to function in the following manner to connect the attendant to this line. Ground through the particular pickup key involved, here taken to be the first key PU00, operates relays 10RL and 10S0 in series over an obvious path which includes break contact 10RL1–1 of relay 10RL1. Relay 10S0, operated, completes a path for operating the 10SM0 select magnets of the line pickup crossbar switch from battery, winding of magnet 10SM0, make contact 10S0–2 of relay 10S0, break contacts 10S9–1 of relay 10S9, 10S2–1 of relay 10S2, and 10S1–1 of relay 10S1, make contact 10S0–3 of relay 10S0 to ground. Relay 10RL, operated closes an operate path for relay 13GS (FIG. 13) from battery, winding of relay 13GS, make contact 10RL–5 of relay 10RL to ground; relay 13GS upon operating completes a path for operating relay 10TR (FIG. 10) from ground, make contact 13GS–1 of relay 13GS, break contact 10TS–1 of relay 10TS, diode 1067, thermistor 1068, winding of relay 10TR to battery. Relay 10TR upon operating releases (at break contact 10TR–4) any hold magnets which may be operated at this time and completes a path for operating relay 10TS traced from ground, make contact 13GS–1 of relay 13GS, make contact 10TR–2 of relay 10TR, winding of relay 10TS to battery; relay 10TS upon operating locks to ground through its own make contact 10TS–2 and make contact 13GS–1 of relay 13GS, and at this time interrupts at its break contact 10TS–1 the operate path for relay 10TR which releases.

With relay 10TS operated and relay 10TR released, relay 10RL1 (FIG. 10) operates over a path from ground, make contact 10TS–3 of relay 10TS, break contact 10TR–3 of relay 10TR, make contact 10RL–1 of relay 10RL, break contact 10RL1–6 and winding of relay 10RL1 to battery; relay 10RL1 upon operating locks to ground through its own make contact 10RL1–2 and make contact 10S0–1 of relay 10S0.

Relay 10RL1 operated interrupts at its 10RL1–1 break contact the operating path for relay 10RL, which releases, but establishes at the same time at its 10RL1–4 make contact a path for holding relay 10S0. The chain circuits through the contacts of the 10S0 to 10S9 relays check that one, and only one, select magnet (10SM0–10SM9) of each switch has ground connected to it. The same select magnet in each switch will operate; the select magnets and the 10RL1 relay will remain operated as long as the pickup key in the console is held operated.

Also at the above-referred-to point, that is with relay 10TS operated and relay 10TR released, an operate path for hold magnet 10HM0 (FIG. 10) is completed from battery, winding and break contact 10HM0–1 of hold magnet 10HM0, make contact of operated pickup key PU00, break contact 10CK–1 of relay 10CK, make contact 10SM0–1 of select magnet 10SM0, break contact 10TR–3 of relay 10TR, make contact 10TS–3 of relay 10TS to ground. Hold magnet 10HM0, upon operating, locks to ground through its 10HM0–2 make contact and break contact 10TR–4 of relay 10TR, completes through its 10HM0–3 make contact an operating path for relay 10CK (FIG. 10) and closes one set of crosspoints of the pickup switch.

Closure of the crosspoints of the pickup switch is effective to connect the twelve leads 381, 382, 383, 384, 387, 388, 391, 392, 393, 394, 397, and 398 from the line circuit associated with the originated call (FIG. 3) through the line pickup circuit (FIG. 10) to the attendant's position and console circuits. Here, as in previously-referred-to instances, in order to avoid undue complication of the drawing, dot-dash lines and brackets have been utilized in an obvious manner to indicate the transfer of this group of leads from one point to another.

When the position circuit has been connected to the originating line as above described, ground is connected to lead 398 (FIG. 12) through break contact 13GS–2 of relay 13GS, relay 13GS having released following release of relay 10RL. Relay 4AC (FIG. 4) of the line circuit operates from this ground on lead 398 through break contacts 4H–3 of relay 4H, 4AC–2 of relay 4AC, and 4ACA–3 of relay 4ACA, winding of relay 4AC to battery; relay 4AC upon operating locks to ground through its 4AC–3 make contact.

Relay 4AC, operated, also completes through its 4AC–4 make contact an obvious operating path for relay 4L1D (FIG. 4), interrupts at its 4AC–1 break contact (FIG. 4) the connection of interrupted battery to lead 458 (SL00) and connects uninterrupted battery thereto through make contacts 3LL–2 of relay 3LL, 3LL1–4 of relay 3LL1, and 4AC–5 of relay 4AC, break contact 4ACA–1 of relay 4ACA, lead 458 to source lamp 1259 (S00) of the position circuit (FIG. 12); this changes lamp 1259 from "flashing" to "steady" as indication that the attendant has "answered" the call. Also, relay 4AC, operated, opens the transmission paths at its break contacts 4AC–5, 4AC–6, 4AC–7 and 4AC–8 (FIG. 3) whereby to split the line since it has now been connected to the attendant's telephone set bridge in the position circuit.

At this point relay 3S (FIG. 3) operates from the simplex ground at the attendant's position circuit (FIG. 12) over leads 381 and 382; relay 3S, operated, applies ground through its 3S–1 make contact (FIG. 3) to lead 311 and operates relay 2APL (FIG. 2) for a purpose described below.

Relay 4L1D, operated as above described, interrupts at its 4L1D–1 and 4L1D–2 break contacts (FIG. 3) the paths for connection of ground to lead 363 and relay 13SIG (FIG. 13) which controls the audible signal at the attendant's position is accordingly released. Also, relay 4L1D upon operating connects battery through its 4L1D–3 make contact to lead 412 (PK00), whereby to light pickup lamp 1213 (PU00) "steady" at the console, and connects ground through its make contact 4L1D–5 and break contacts 4DSS–1 of relay 4DSS and 4ATT–3 of relay 4ATT to lead 414 and thence to the marker 517 (FIG. 5) for making the line busy to the marker in the usual manner.

When the "answer" signal operates relay 2APL (FIG. 2) as above described, operation of relay 2APL1 follows on the path from ground, make contact 2APL–1 of relay 2APL, break contact 2APL2–1 of relay 2APL2, winding of relay 2APL1 to battery; relay 2APL1 upon operating locks through its 2APL1–1 make contact and make contact 2APL-1 of relay 2APL to ground, and opens at its 2APL1–2 break contact the operating path of relay 2RR whereby to prevent the operation of that relay upon operation of relay 2APL2. Relay 2APL2 operates following operation of relay 2APL1, the operating path being completed through cake contact 2APL1–3 of that relay and locks to ground through its own make contact 2APL2–2 and make contact 2L1–2 of relay 2L1. Relay 2APL2, operated, partially completes through its make contacts 2APL2–3 and 2APL2–4, respectively, operating paths for relays 2RR and 2SR, which have no circuit functions at this time, and also completes through its make contact 2APL2–5 and make contact 2L0–1 of relay 2L0 a locking path for relay 2L0 whereby to prevent relay 2L0 from releasing before the release of relay 2APL2 at the time of disconnect. Relay 2APL2, operated, also opens at its 2APL2–1 break contact the operating path of relay 2APL1 which however remains locked through its own make contact 2APL1–1.

The circuits are now in condition for conversation between the originating extension station and the attendant.

*Attendant Extends Connection*

After determining from the originating subscriber the identification of the desired called line, the attendant signals for connection of the line circuit to a register by operation of the PDSS (Direct Station Selection) key of the console circuit (FIG. 13) which corresponds to the desired called line; it will be assumed that PDSS00 key is operated.

Relay 13TM of the position circuit (FIG. 13) is in operated position at this time following closure of the Talk key 1382 when the attendant picked up the line (ground, make contact 10CK–2 of relay 10CK, make contact of Talk key 1382, winding of relay 13TM to battery) so that upon closure of PDSS00 key as above-mentioned relay 13PDSS (FIG. 13) operates over a path from ground, make contact 13TM–1 of relay 13TM, closed contacts of PDSS00 key, winding of relay 13PDSS to battery; operation of relay 13PDSS applies ground through its 13PDSS–1 make contact (FIG. 12) to lead 397 which causes operation of relay 4DSS (FIG. 4) of the line circuit.

Relay 4DSS, operated, connects ground through its make contacts 4DSS–1 and 4DSS–2 and make contact 3LL1–4 of relay 3LL1 to leads 418 and 421 and thereover to marker 517 which responds by selecting an idle link, an idle register, by identifying the calling line and by connecting the line to the register over the selected link. (As previously mentioned these portions of the circuit are in arrangement and operation generally as described in previously issued patents, for example R. D. Williams Patent 2,904,637, and will not be described in detail herein.)

Relay 4DSS, operated, also removes at its 4DSS–11 break contact (FIG. 4), the make busy ground from lead 414 whereby to allow access by marker 517 to the line, and connects ground through its 4DSS–4 make contact (FIG. 3) to line 311 whereby to retain answered supervision to the auxiliary line circuit.

Marker 517 in line with the above-referred--to operations applies ground to line 414 as a signal to the line that the link and register have been selected; this ground on lead 414 is extended through break contact 4ATT–3 of relay 4ATT and make contacts 4L1D–5 of relay 4L1D and 4DSS–5 of relay 4DSS, through the winding of relay 4LH to battery whereby to operate relay 4LH. Relay 4LH, upon operating, locks to ground through its own make contact 4LH–2, break contacts 4ATT–4 of relay 4ATT and 3RV–2 of relay 3RV, make contact 4L1D–6 of relay 4L1D to ground. Relay 4LH, operated, connects ground through its 4LH–3 make contact to lead 422 for operation of the hold magnet 5LHM0 (FIG. 5) associated with this particular line and extends its holding ground (make contact 4L1D–6 of relay 4L1D, FIG. 4) through its make contact 4LH–4 and break contact 4ATT–5 of relay 4ATT over lead 423 and through resistor 424 toward the link and connector circuit (FIG. 5); this ground is used to lock the magnets for both the line circuit and the register from which it follows that the entire connection is under control of the calling line circuit. Also, relay 4LH upon operating opens at its break contact 4LH–5 the operating path of relay 4DSS (FIG. 4) which releases and removes the ground signal from leads 418 and 421 (FIG. 4); connects interrupted battery through interrupter contact INT–2 (FIG. 4), its own make contact 4LH–6 and break contacts 3RV–3 of relay 3RV and 3LS2–1 of relay 3LS2 to line 427 and thereover to the position and console circuits (FIG. 12) where it flashes destination lamp 1228 (D00) at 30 i.p.m. (the rate at which the battery is interrupted) as an "Awaiting Called Station Answer" signal; and connects ground through its make contact 4LH–7 (FIG. 3) and break contacts 3LS2–2 of relay 3LS2 and 4LS1–2 of relay 4LS1 to line 311 (FIGS.

3 and 2) whereby to maintain answered supervision to the calling party.

When PDSS00 key (FIG. 13) was operated as above described, in addition to operating relay 4DSS of the line circuit, it also transmitted (by normal functioning of Direct Station Selection as mentioned above), through contacts 1388 and 1389 of the particular key, tens and units identification of the called line to the dial pulse registers 543 (FIG. 5) as indicated by the dot-dash lines and bracket. (Each extension line circuit has a two-digit number assignment corresponding to its position in the crossbar switch field and its appearances at the attendant's console.) In response to the tens and units information the register, operating in its normal calls in the marker which proceeds to connect the called line circuit (similar to the calling line circuit described) to the link originally used to connect the calling line to the register. Following this operation the register is released from the connection.

Figure 3:
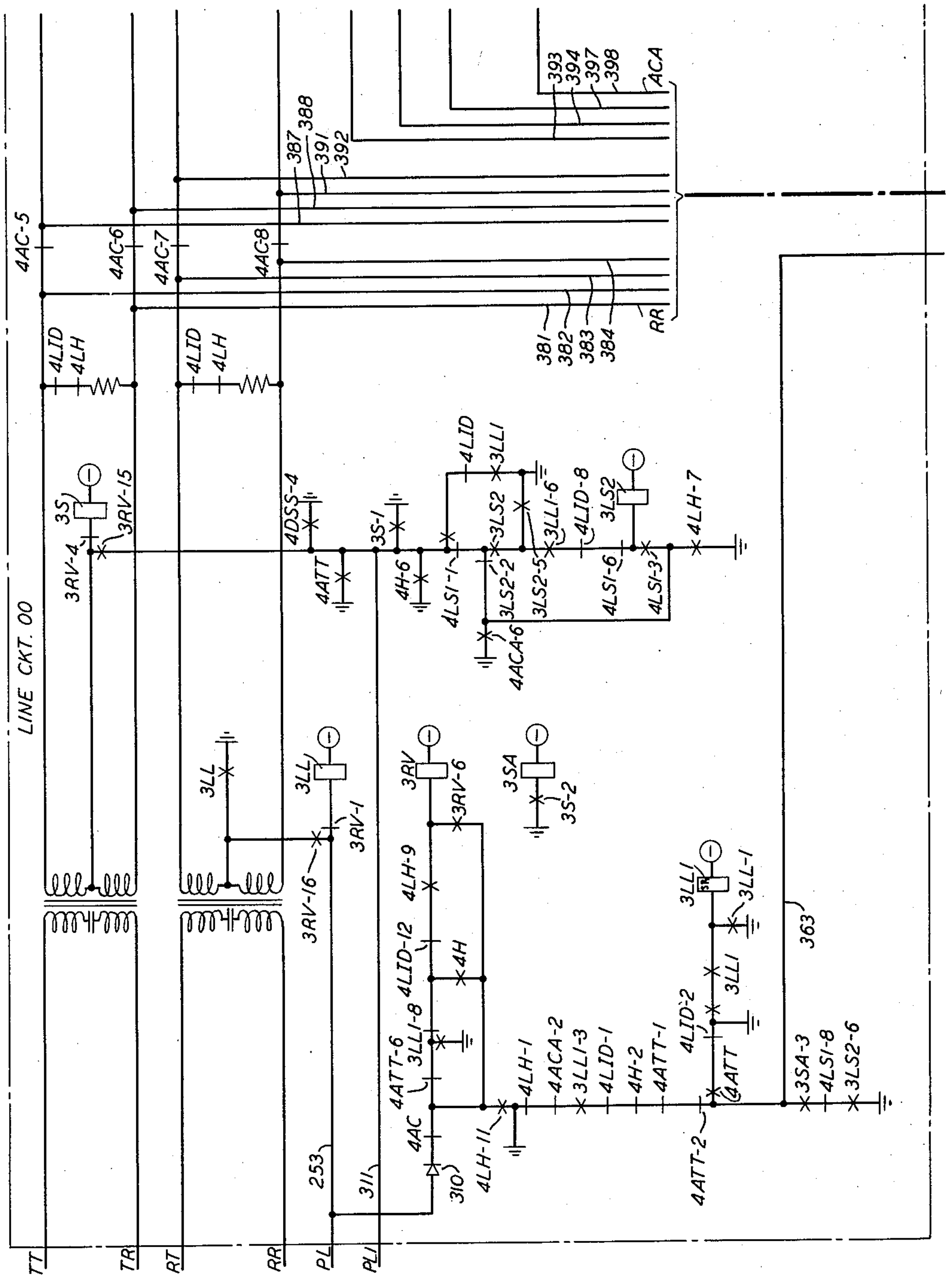
FIGS. 3 and 4 show one line circuit.
Figure 4:
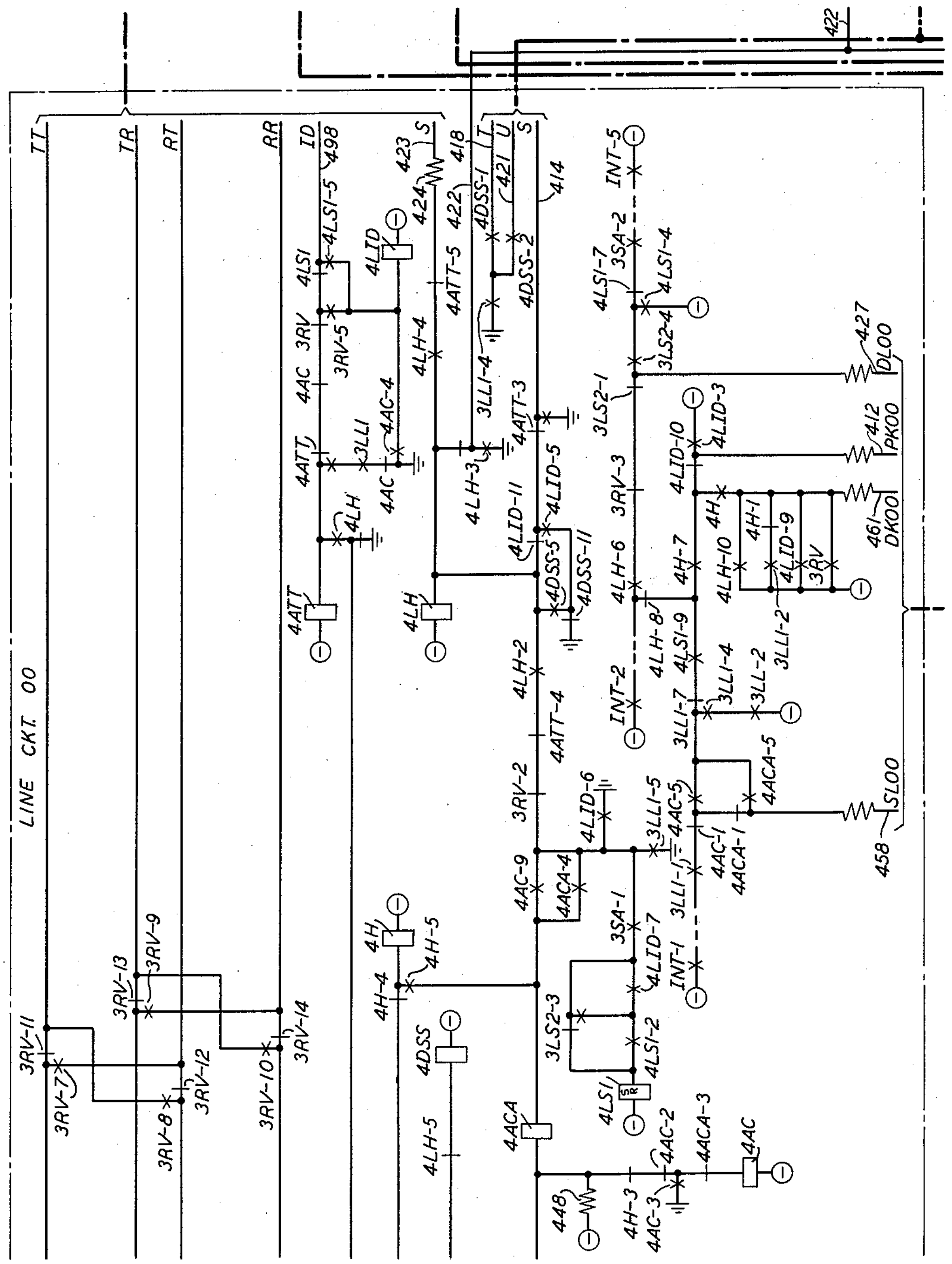

The called line circuit (similar to the calling line circuit, FIGS. 3 and 4) extends the RT and RR simplex mark to the connected auxiliary circuit over a lead corresponding to lead 311 of FIGS. 2 and 3; the auxiliary line circuit responds by signalling the called station in the normal manner. For purposes of simplifying and reducing the size of the drawing, the called line and auxiliary line circuits will not be shown separately but the completion of the call will be described by referring to FIGS. 2 and 3; it will be understood that in this instance relays 2L and 2L2 will be in released position since the loop at the called station is still open. The ground applied to the control lead of the called auxiliary line circuit, which we will assume for the present description to be lead 311, will operate relay 2APL; operation of relay 2APL causes operation of relays 2APL1 and 2APL2 as previously described. In this instance, however, relay 2L0 does not operate since relay 2L1 is in released position. When the interrupter closes, ground is connected through closed contact INT-3 of the interrupter, make contact 2APL2-4 of relay 2APL2, break contact 2L0-2 of relay 2L, winding of relay 2SR to battery, relay 2SR operating over this path.

Relay 2SR, operated, connects A.C.-D.C. audible tone from source 244 through break contact 2L-3 of relay 2L and its own make contact 2SR-1 to line conductor 257 and connects ground through its make contact 2SR-2 to the other line conductor 254. At the same time, i.e., when relay 2SR operates, it connects A.C.-D.C. audible tone from source 247 through its make contact 2SR-3 to line conductor 252 toward the calling end and connects ground through its make contact 2SR-4 to line conductor 251. As relay 2SR follows the operation of the interrupter, the connection of the audible tones and ground will be intermittently completed and interrupted whereby to produce a "ringing" cycle on the called line. The cycles will be repeated until the station answers by going off-hook or until the call is abandoned.

*Called Station Answers*

When the called station answers and the station loop is closed the operation of the called auxiliary line circuit is similar to that described above in connection with the origination of a call. In this instance however, operation of relay 2L will remove at its 2L-3 break contact the A.C.-D.C. tone from source 244 and operation of relay 2L0 (following operation of relays 2L and 2L1) will open at its break contact 2L0-2 the operating path of relay 2SR which releases and opens the tone and ground connections to the lines.

It will be recalled from preceding description that following operation of relay 4LH destination lamp 1228 (D00) of the console circuit (FIG. 12) was lighted and continued to "flash" at 30 i.p.m. as an "awaiting answer" signal to the attendant. When the called party answers the called line circuit grounds the TT—TR simplex through the link and this ground is sensed by relay 3S (FIG. 3) of the calling line circuit through break contact 3RV-4 of relay 3RV. Relay 3S operates, connects ground to line 311 (FIGS. 2 and 3) through its 3S-1 make contact to maintain answered supervision, and completes through its 3S-2 make contact, a path for operation of relay 3SA (FIG. 3). Relay 3SA, operated, completes an operating path for relay 4LS1 (FIG. 4) traced from ground, make contact 3LL1-5 of relay 3LL1, make contact 3SA-1 of relay 3SA, break contact 3LS2-3 of relay 3LS2, winding of relay 4LS1 to battery. Relay 4LS1, upon operating, locks to the same ground through its own make contact 4LS1-2 and make contacts 4L1D-7 of relay 4L1D and 3SA-1 of relay 3SA. Relay 4LS1, operated, completes a path for operating relay 3LS2 (FIG. 3) from ground, make contact 4LH-7 of relay 4LH, make contact 4LS1-3 of relay 4LS1, winding of relay 3LS2 to battery.

After both relays 4LS1 and 3LS2 have operated, the interrupted battery is removed from lead 427 at break contact 3LS2-1 of relay 3LS2 (FIG. 4) and uninterrupted battery is connected thereto through make contact 4LS1-4 of relay 4LS1 and make contact 3LS2-4 of relay 3LS2; destination lamp 1228 (D00) at the attendant's position circuit (FIG. 12) is now lighted "steady" therefore as a "called party answer" signal. Also relay 4LS1 operated partially prepares through its make contact 4LS1-5 (FIG. 4) an operate path for relay 4L1D from the links if this circuit is seized for identification later.

*Attendant Releases*

When the attendant relases the console circuit from the line, for example by operation of the Position Release Switch 1381 (FIG. 13) ground is removed from lead 398 at break contact 13GS-2 of relay 13GS (FIG. 12), since relay 13GS operates from ground through the closed contacts of switch 1381; removal of this ground permits relay 4ACA (FIG. 4) to operate from battery through resistor 448, winding of relay 4ACA, make contact 4AC-9 of relay 4AC, make contact 3LL1-5 of relay 3LL1 to ground; relay 4ACA upon operating locks to this ground through its 4ACA-4 make contact. Relay 4ACA, operated, opens at its 4ACA-3 break contact the holding path of relay 4AC which releases; continues through its 4ACA-5 make contact (FIG. 4) the path for lighting lamp 1259 (FIG. 12) over lead 458; opens at its 4ACA-2 break contact (FIG. 3) a connection to lead 363, and completes at its 4ACA-6 make contact (FIG. 3) another path for connection of ground to lead 311 to maintain answered supervision to the calling party.

Relay 4AC, released, connects at its 4AC-5, 4AC-6, 4AC-7 and 4AC-8 break contacts (FIG. 3) the transmission path through to the links and interrupts at its 4AC-4 make contact (FIG. 4) the operating path of relay 4L1D, which releases. Relay 4L1D, released, removes at its 4L1D-3 make contact (FIG. 4) battery from lead 412 whereby to extinguish pickup lamp 1213 (PU00) of the console circuit (FIG. 12).

*Attendant's Position and Console Circuits*

In addition to those functions of the position and console circuits which have already been discussed above in connection with the originating and completing of a call, various other functions are, of course, carried out by these circuits a few of which will be described at this point.

As pointed out previously relay 13S1G (FIG. 13) is operated during origination of a call and it was stated that operation of this relay caused an audible signal at the console to be operated. Relay 13S1G, operated, connects interrupted battery through interrupter contact INT-4 (FIG. 12), ballast lamp 1251, make contact 13S1G-1 of relay 13S1G through Bell Chime 1252 which is sounded as an alerting signal to the attendant. When the attendant operates her Signal Cutoff Key 1380 (FIG. 13) a path is completed for operation of relay 13SCO, traced from ground, make contact 10CK-2 of relay 10CK, closed contact of signal cutoff key 1380, make contact 13S1G-2 of relay 13S1G, break contact 13SCO–2 of relay 13SCO, winding of relay 13SCO to battery; relay 13SCO upon operating locks through its 13SCO–3 make contact to the ground on lead 363, releases relay 13S1G by interrupting the operating path at break contact 13SCO–1, and connects through its 13SCO–4 make contact (FIG. 13) battery to the energizing paths of signal cutoff lamps 1353 and 1354 of the console whereby to light these lamps.

Relay 13S1G upon releasing interrupts at its 13S1G–1 make contact the energizing path of Bell Chime 1252 which is silenced, and interrupts at its make contact 13S1G–2 the path over which relay 13SCO was operated. Relay 13SCO remains operated over the locking path to lead 363, however, until all calls have been answered. The last line circuit to be answered removes ground from lead 363 and relay 13SCO releases. Subsequent calls will operate relay 13S1G as described.

Bell Chime 1252 (FIG. 12) may also be operated by closing 13ALM CONT–1 (FIG. 13) which completes an obvious path through break contact 13ACO–1 of relay 13ACO for operation of relay 13ALM; the path for energizing Bell Chime 1252 is then completed through make contact 13ALM–2 of relay 13ALM. ALM lamp 1357 of the console will light when 13ALM CONT–1 is closed.

Closure of the Alarm Cutoff key 1393 (FIG. 13) will operate relay 13ACO over a path through break contact 13PH–1 of relay 13PH to the 13ALM CONT–1 battery; relay 13ACO upon operating will lock to ground through its 13ACO–2 make contact. Relay 13ACO, operated, completes a path through its 13ACO–3 make contact for lighting Alarm Cutoff lamp 1358 (FIG. 13) and opens at its 13ACO–1 break contact the operating path of relay 13ALM, which releases. Relay 13ALM upon releasing interrupts at its 13ALM–2 make contact the energizing path of Bell Chime 1252 which is silenced. Relay 13ACO will remain operated until the battery is removed at 13ALM CONT–1.

The console circuit telephone set, including transmitter 1289 and receiver 1260, and the line circuits, as connected, are interconnected on a four-wire basis by resistance bridge 1271 which, preferably, follows the general arrangement covered by United States Patent 2,035,536, March 31, 1936, F. A. Cowan et al. As disclosed in that patent a bridging network circuit comprises a balanced structure made up of resistances and having four equivalent branch outlets all arranged so that the impedance looking into any branch is about 650 ohms. (In the present instance only three of the branches are utilized and the fourth is not connected.) With this bridging arrangement there is a low-loss path through only two resistors from any input to the other two outputs. However, the only path from an input to its own correspondingly numbered output is through several resistors in series and reversals are introduced in half of these paths whereby to produce a 180 degree phase difference thereby greatly reducing the reflection currents and resulting in very little interaction between the branch circuits. Amplification is provided by amplifiers 1272, 1273 and 1274 to overcome the loss introduced by the bridge.

Battery feed coils 1277 (FIG. 12) supply the transmitter battery to the attendant's telephone circuit while induction coil 1278 is utilized to match the transmitter impedance with that of the line. Resistance pad 1281 is provided to control the level from the transmitter to the resistance bridge 1271. Resistors 1282 and 1283 provide desired sidetone paths and resistor 1284 provides termination. Resistors 1297, 1288, 1201 and 1202 are idle circuit terminations for the lines.

When relay 13TM (FIG. 13) operates as previously described following closure of the Talk Switch 1382, the battery supply path to transmitter 1289 (FIG. 12) is closed at make contact 13TM–2 and when relay 12HS operates idle circuit termination resistor 1284 is removed from the circuit at break contact 12HS–2 and receiver 1260 is connected over make contact 12HS–1 to bridge 1271. Also, when relay 13TM is operated Talk lamps 1304 and 1317 (FIG. 13) are lighted over an obvious path through 13TM–3 make contact.

Operation of the Signal Back Key 1387 (FIG. 13) of the console circuit, after a line has been picked up and the position circuit is in "Talk" condition, will operate relay 13SOR over an obvious path from ground through make contact 13TM–1 of relay 13TM; this will complete a path through make contact 13SOR–2 for lighting Signal Back lamps 1305 and 1306 as an indication that the position circuit has functioned and the attendant may dial, ring or automatic signal toward the calling party. Relay 13SOR upon operating locks through its own make contact 13SOR–3, break contacts 13PDSS–2 of relay 13PDSS, 13STR–3 of relay 13STR, 13GS–3 of relay 13GS and 1390 of Link Release Switch, make contact 13TM–1 of relay 13TM to ground. Relay 13SOR, operated, opens at its break contact 13SOR–1 the locking path for relays 13STR and 13STR1, opens at its break contact 13SOR–4 the locking path for relay 13DSSL and opens at its break contact 13SOR–5 a path over which ground is connected to coil 1223 (FIG. 12) through make contact 12D–1 of relay 12D when that relay is operated.

Operation of the Signal Forward Key 1386 (FIG. 13) of the console circuit, after a line has been picked up and the position circuit is in "talk" condition, will operate relay 13STR and 13STR1 from ground through make contact 13TM–1 of relay 13TM; this completes a path through make contact 13STR–1 to light Signal Forward lamps 1328 and 1311 at the console whereby to indicate that the position circuit has functioned and that the attendant may dial, ring or automatic signal toward the called party. Relays 13STR and 13STR1, upon operating, lock to ground through make contact 13STR–2 of relay 13STR, break contacts 13SOR–1 of relay 13SOR, 13GS–3 of relay 13GS and 1390 of Link Release Key, make contact 13TM–1 of relay 13TM to ground. Relay 13STR, operated, opens at its 13STR–3 break contact the locking path of relay 13SOR, opens at its 13STR–4 break contact the simplex between coils 1223 and 1214 (FIG. 12), connects ground from the pulsing springs of calling dial 1217 of the console through break contact 13FR–1 of relay 13FR and its own make contact 13STR–5 to coil 1214, and connects ground through its 13STR–6 make contact (FIG. 12) over lead 397 to the line pickup circuit. Relay 13STR1, operated, interrupts at its 13STR1–1 break contact (FIG. 13) the locking path of relay 13DSSL and removes at its 13STR1–2 break contact (FIG. 12) the connection of ground to coil 1223.

The Ring Key 1385 (FIG. 13) is utilized to ring, rering and flash on a line picked by the attendant, the direction of the signal being determined by the position of the Signal Forward or Signal Back keys. Closure of the Ring key operates relay 13FR from ground through 13TM–1 make contact of relay 13TM; relay 13FR, operated, closes at its 13FR–2 make contact an energizing path for Ring lamps 1318 and 1331 (FIG. 13) of the console.

*Called Party Recalls Attendant*

After the originating, or calling party and the called party have been connected for talking and the attendant has disconnected as previously described above it may well happen that the called party may wish to recall the attendant, for example to have the call transferred. Accordingly, the called subscriber will momentarily depress the called station switchhook which action is relayed from the called station to the calling station by a momentary opening of the transmitting line simplex. Relay 3S (FIG. 3) releases in response to this signal; relay 3S, released, releases relay 3SA (make contact 3S–2) which, in turn, releases relay 4LS1 (FIG. 4) by interrupting the holding path at make contact 3SA–1. Relay 3LS2 (FIG.

3) will not release at this time since, when relay 4LS1 releases, relay 3LS2 will then hold over a path to ground through break contacts 4LS1–6 of relay 4LS1 and 4L1D–8 of relay 4L1D, make contact 3LL1–6 of relay 3LL1 and 3LS2–5 of relay 3LS2. Relay 3S will again operate, following reclosure of the called station loop (by releasing the switchhook), and operation of relay 3SA follows operation of relay S. Relay 4LS1 (FIG. 4) does not reoperate following reoperation of relay 3SA, however, since its operate path is open at break contact 3LS2–3 of relay 3LS2. With relays 3SA and 3LS2 operated and relay 4LS1 released a path is completed for flashing destination lamp 1228 (FIG. 12) at 120 i.p.m. as a visual recall signal to the attendant. Lamp 1228 was previously lighted at "steady" by battery from make contact 4LS1–4 of relay 4LS1 but is now "flashed" by battery through interrupter contact INT–5 (FIG. 4) make contact 3SA–2 of relay 3SA, break contact 4LS1–7 of relay 4LS1, make contact 3LS2–4 of relay 3LS2, lead 427, lamp 1228 (FIG. 12) to battery. At the same time ground is applied to lead 363 (FIG. 3) through make contact 3LS2–6 of relay 3LS2, break contact 4LS1–8 of relay 4LS1 and make contact 3SA–3 of relay 3SA; this ground operates relay 13S1G (FIG. 13) of the position circuit, which in turn operates Bell Chime 1252 (FIG. 12) of the console circuit in the manner previously described.

The attendant in response to the audible and visual signals re-enters the line circuit involved by operating the particular pickup key associated with the "flashing" destination lamp. Operation of the pickup key is followed by release of relay 4ACA (FIG. 4) in the manner previously described above (the battery through resistor 448 being shunted by ground applied to lead 398 through break contact 13GS–2 of relay 13GS, FIG. 12). Relay 4ACA, released, closes a path for operation of relay 4AC (FIG. 4) from the ground on lead 398 through break contacts 4H–3 of relay 4H, 4AC–2 of relay 4AC, 4ACA–3 of relay 4ACA, winding of relay 4AC to battery; relay 4AC upon operating locks to ground through its 4AC–3 make contact. Relay 4AC, operated, reoperates relay 4L1D (FIG. 4) through its make contact 4AC–4, and also splits the transmission paths at break contacts 4AC–5, 4AC–6, 4AC–7 and 4AC–8 (FIG. 3).

Relay 4L1D, operated, releases relay 3LS2 (FIG. 3) by opening the holding path therefor at break contact 4L1D–8; relay 3LS2, released, closes at its break contact 3LS2–3 a path over which relay 4LS1 (FIG. 4) now operates. Relay 4LS1, operated, closes at its 4LS1–3 make contact a path for operating relay 3LS2. Now, with relays 4LS1 and 3LS2 both operated, interrupted battery is removed from line 427 (break contact 4LS1–7) and battery is connected "steady" thereto through make contacts 4LS1–4 of relay 4LS1 and 3LS2–4 of relay 3LS2 whereby to light destination lamp 1228 (FIG. 12) at "steady." Also, ground is removed from line 363 at break contact 4LS1–8 of relay 4LS1 (FIG. 3) whereby to release relay 13S1G (FIG. 13) and silence audible signal 1252 (FIG. 12) at the console. Since the transmission line has been split as above described the attendant can now talk with both the called and the calling party and can take what action is indicated.

*Disconnect at Completion of Call*

Let us assume now that the conversation is completed and that the originating, or calling party disconnects first. When the calling station goes on-hook the opened loop on the "transmit" leads 251 and 252 releases relay 2L (FIG. 2). Relay 2L, released, releases in turn relay 2L1 by opening the operating path therefor at make contact 2L–1: Relay 2L1, released, removes at its 2L1–1 make contact the ground from lead 253 as an "on-hook" signal to the line circuit. Also, relay 2L1 by releasing interrupts at its 2L1–2 make contact the locking path for relay 2APL2 and opens at its 2L1–21 make contact the operating path of relay 2L0. (Neither relay 2APL2 nor relay 2L0 releases at this point however.)

When the ground is removed from lead 253 as above described, relay 3LL (FIG. 3) releases. Relay 3LL, released, releases at its 3LL–1 make contact relay 3LL1 which, in turn releases the other operated relays of the line circuit. Relay 4LH (FIG. 4) released at make contact 3LL1–5 of relay 3LL1, removes at make contact 4LH–3 ground from lead 422 and the Line Hold Magnet in the Link and Connector Circuit (FIG. 5) permitting it to release. Also ground is removed at 4LH–4 make contact from lead 423 (FIG. 4) toward the Link and Connector Circuit permitting the 4LH relay in the terminating line circuit (not shown but similar to originating line circuit) to release, in turn releasing the line hold magnet for that circuit.

When the called party disconnects and opens the called station loop ground is removed from the transmit line simplex releasing relay 3S (FIG. 3) in the originating line circuit. Relay 3S, released, releases relays 3SA and 4LS1. Thus, with relay 3LS2 operated and relays 4LS1 and 3SA released battery (both steady and intermittent) is removed from lead 427 and destination lamp 1228 (FIG. 12) goes "dark" as an indication that the called party is on-hook. At this time also, that is when relay 3S releases, ground is removed from lead 311 at make contact 3S–1 (FIG. 3) and relay 2APL (FIG. 2) releases. Relay 2APL, released, opens at its make contact 2APL–2 the operating path of relay 2RR and opens the holding path of relay 2APL1 at make contact 2APL–1. Relay 2APL1 releases and opens the operating path of relay 2APL2 at make contact 2APL1–3. Relay 2APL2 released, opens at its 2APL2–5 make contact the holding path of relay 2L0 which releases. The circuit is now restored to normal condition.

*Attendant Originated Outgoing Call*

The attendant in order to initiate a call to a station operates the pickup key (FIG. 10) associated with the desired line. The line pickup circuit and the attendant's position and console circuits operate in a manner similar to that described above to connect the console to the desired line. When the console circuit is connected ground is connected to lead 398 at break contact 13GS–2 of relay 13GS (FIG. 12); this ground applied to the line circuit over line 398 operates relay 4AC (FIG. 4) but shunts the battery connection through resistor 448 whereby to hold relay 4ACA nonoperated. Relay 4AC upon operating opens the path towards line 398 at break contact 4AC–2, locks to ground through make contact 4AC–3, splits the transmission paths at break contacts 4AC–5, 4AC–6, 4AC–7 and 4AC–8 (FIG. 3) and completes at its 4AC–4 make contact (FIG. 4) a path for operating relay 4L1D.

Relay 4L1D, operated, connects battery through its 4L1D–3 make contact to lead 412 and thereover to light pickup lamp 1213 (FIG. 12), and connects battery through its 4L1D–9 make contact (FIG. 4) to lead 461 and thereover to light lamp 1262 (FIG. 12) at the console circuit as a visual busy signal. Also, relay 4L1D operated connects through its 4L1D–5 make contact ground over lead 414 towards marker 517 as a line busy mark.

Relay 3S (FIG. 3) operates at this time from the simplex mark at the attendant's position through break contact 3RV–4 of relay 3RV whereby to connect ground through its 3S–1 make contact (FIG. 3) over lead 311 to the connected auxiliary line or two-way trunk circuit to signal "off-hook" supervision to that circuit. The connected auxiliary line circuit or two-way trunk circuit then proceeds to signal the distant end in an appropriate manner as previously described.

Relay 3S, operated as above described, operates relays 3SA (FIG. 3) and 4LS1 (FIG. 4) over paths previously described above. Battery is now applied to lead 458 (FIG. 4) through interrupter contact INT–2, break contact 4LH–8 of relay 4LH, make contact 4LS1–9 of relay 4LS1, break contact 3LL1–7 of relay 3LL1, make contact 4AC–5 of relay 4AC, break contact 4ACA–1 of relay 4ACA and over lead 458 to flash Source lamp 1259 (S00) at the console (FIG. 12) at 30 i.p.m as an "awaiting answer" signal.

*Establishment of Conference Bridge Connections*

As previously pointed out above the novel arrangement contemplated by our invention includes two conference bridges each of which comprises a six-branch, or six-leg, resistance bridge, each of which branches or legs comprises a four-wire line. In each instance five of the legs or branches are utilized for connecting respective lines to the bridge for conference connections while the sixth leg of the first bridge and the sixth leg of the second bridge may be connected in tandem on occasion whereby to attain a single conference connection with a capacity of ten lines. (This is shown schematically in FIG. 1, rectangle 137.) It will now be assumed for purposes of further description that in the above-described instance the originating subscriber had requested that a conference connection be set up.

Figure 5:
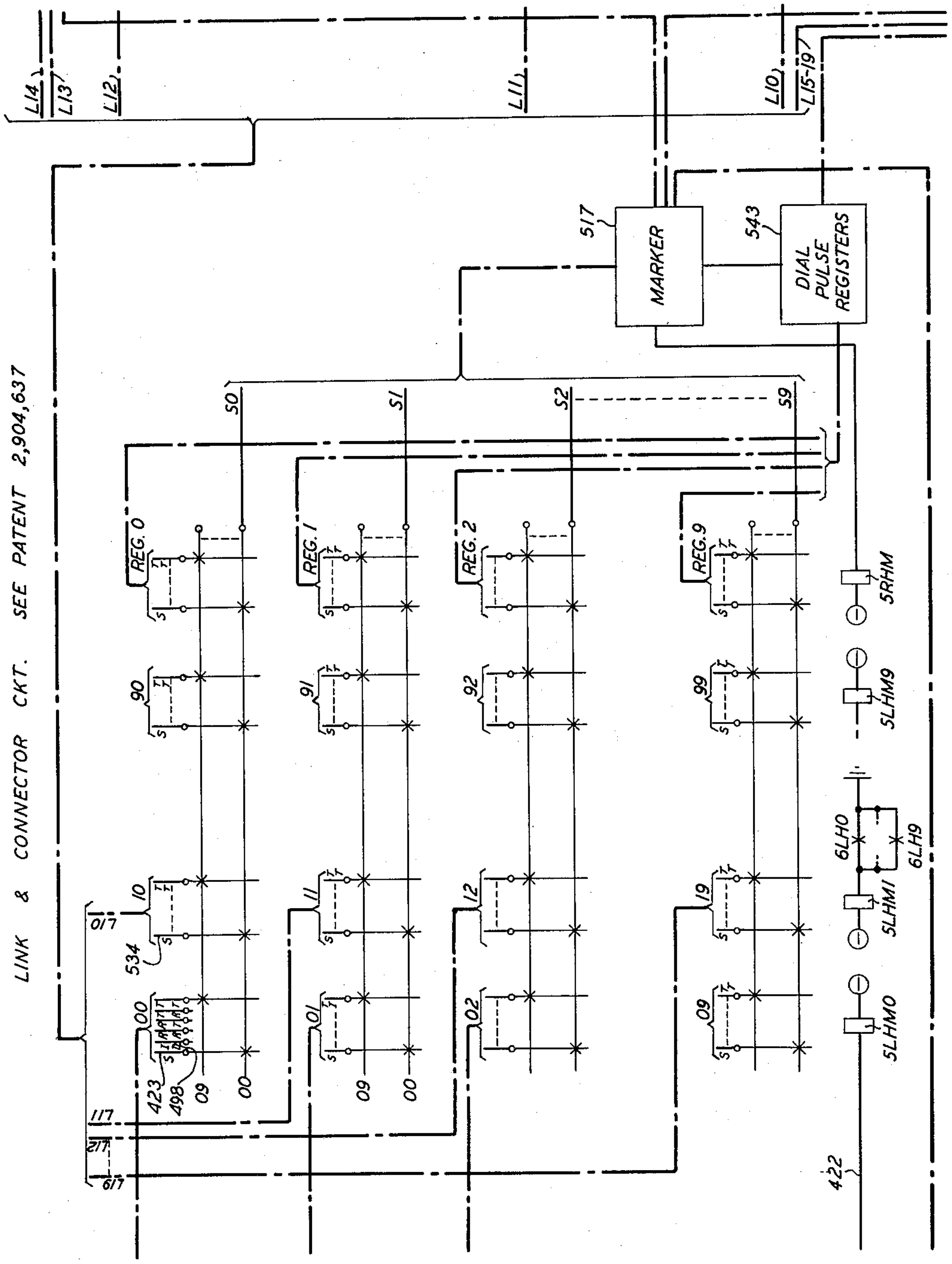
FIG. 5 shows schematically portions of the link and connector circuit as shown and described completely in the Williams Patent 2,904,637 referred to above.
Figure 6:
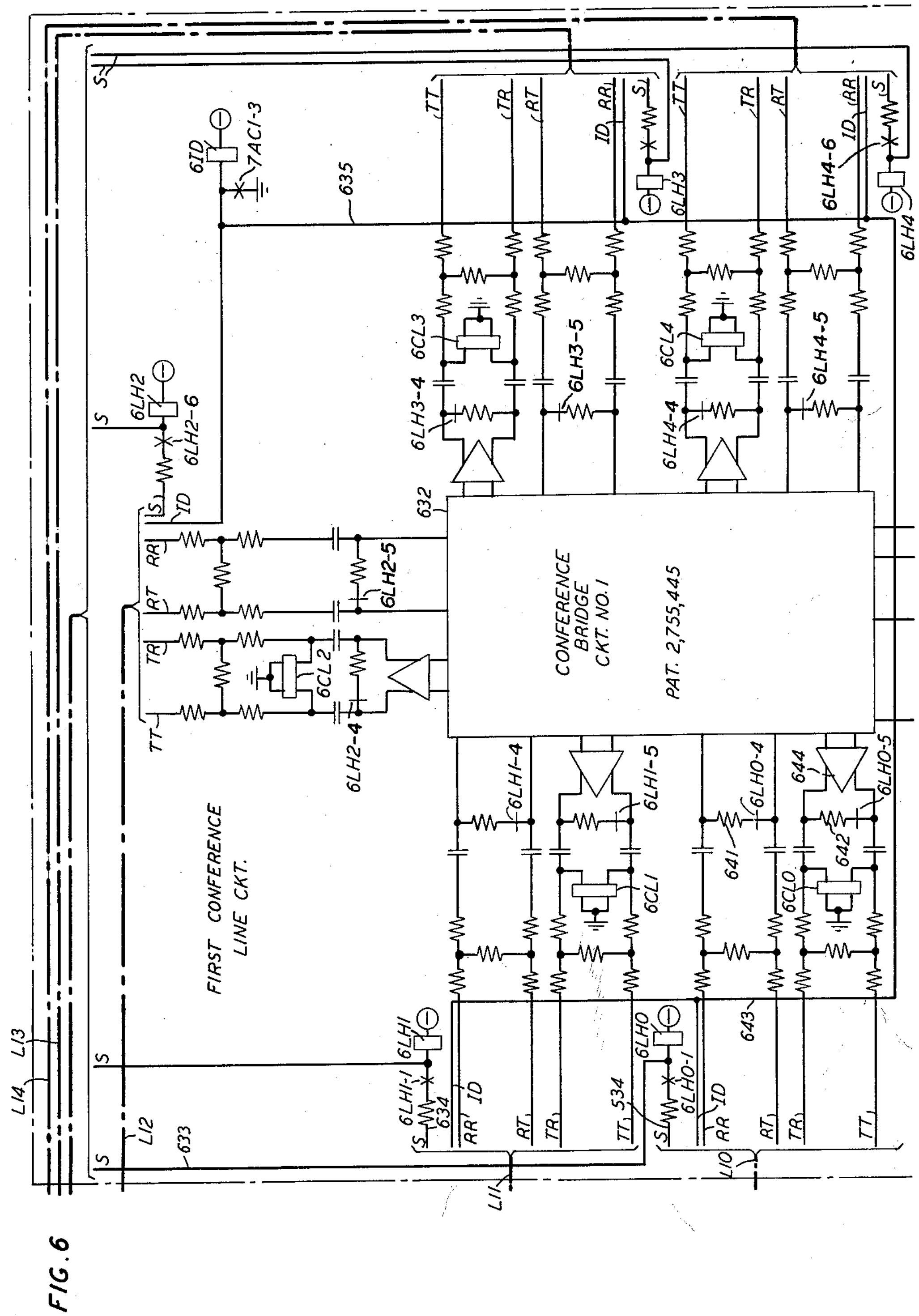
FIGS. 6 and 7 show particularly the conference line circuits, the first conference line circuit being shown in detail and the second being indicated by a captioned rectangle.
Figure 7:
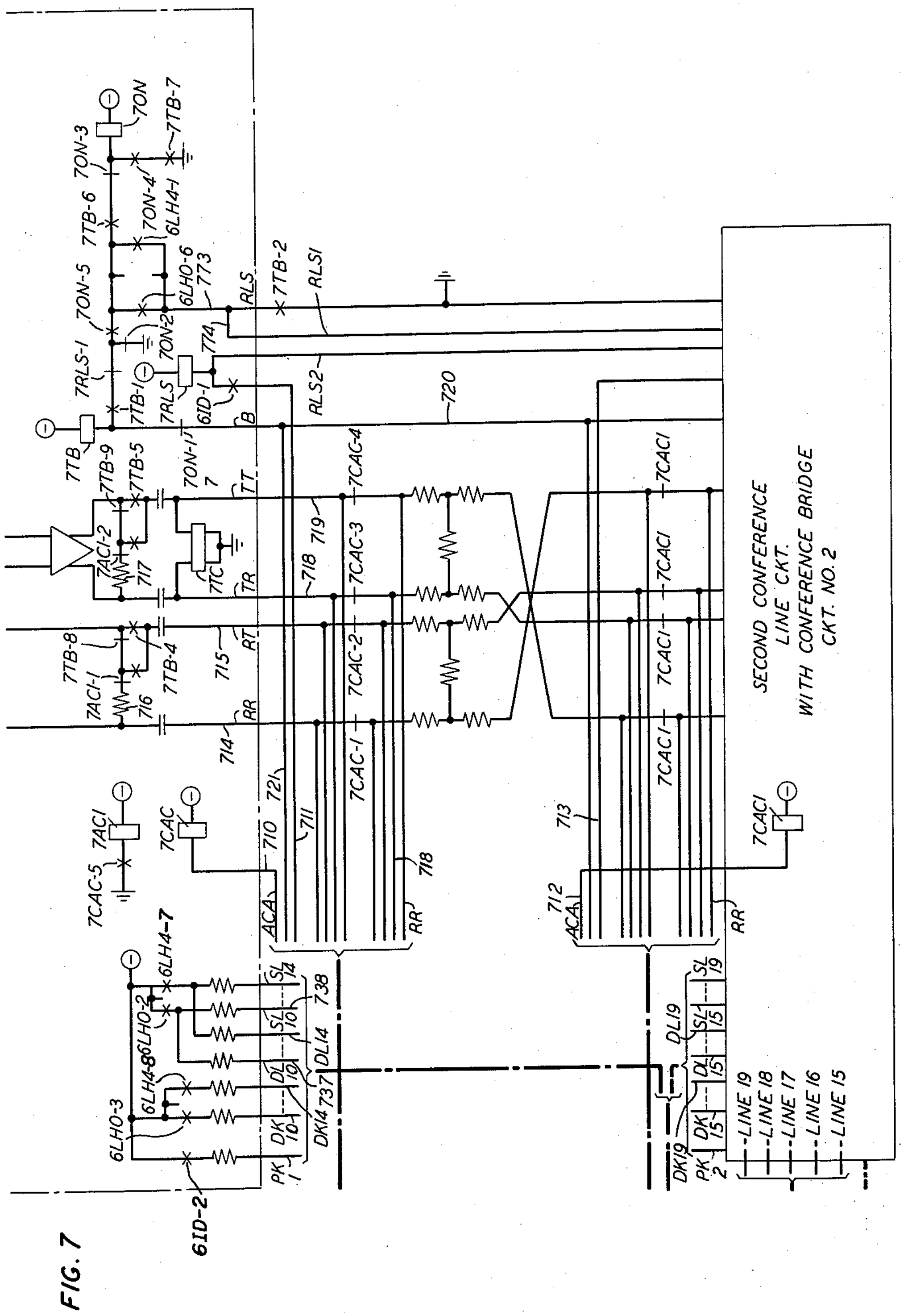

Referring particularly to FIGS. 6 and 7 the first conference line circuit, with conference bridge circuit No. 1, is shown in detail, while, in order to avoid undue enlargement and complication of the drawing, the second conference line circuit is indicated by a captioned rectangle; the two conference line circuits and the respective bridges are similar in arrangement. It will be assumed for purposes of description, and is so shown by the dash-dot lines and brackets that line terminations 10 to 19 inclusive of the link and connector circuit (FIG. 5) are assigned to conference service, lines 10 to 14 inclusive being assigned to the first conference line circuit and lines 15 to 19 inclusive being assigned to the second conference line circuit.

Each conference bridge circuit, that is conference bridge circuit No. 1, 632 (FIG. 6) and the similar conference bridge circuit No. 2 (not shown) comprises a resistance bridge circuit having six branches or legs, the general arrangement of which is as disclosed in Patent 2,755,445, July 1956, H. A. Rhodes. With this bridging arrangement there is provided in the manner fully described in the Rhodes patent a low-loss path through only two resistors from any input, that is, the "in" side of a respective four-wire line, to the other five outputs, that is, the "out" sides of the other four-wire lines, while the only connection from a respective input to its correspondingly numbered output is through several resistors in series with reversals being introduced in certain of the paths to produce a 180 degree phase reversal thus greatly reducing the reflection currents and resulting in very little interaction between the branch circuits. This arrangement provides efficient coupling of the four-wire lines for conference purposes, therefore, since there is good transmission from the "in" or transmitting path of each line to the receiving path of each of the other lines, and yet practically no transmission from the transmitting path of any line to its own receiving path. In the instance of each bridge of the present inventive circuit, that is, conference bridge No. 1 and conference bridge No. 2, five of the four-wire legs are utilized, as pointed out above for connection of the respective five conference lines while the sixth legs of the two bridges are utilized for establishing on occasion a tandem connection of the two bridges.

In general, conference calls are handled just as any other type of call. For example assuming that the attendant has ascertained that a conference is desired between extensions A, B, and C, she first operates keys for Station A just as described above in connection with "Attendant Originated Outgoing Call." When the called extension answers, the terminating key for a leg of a conference bridge (lines 10 to 19) is operated whereby to connect Station A to the conference bridge. Stations B and C may be added by repeating the actions used to connect station A. Assuming that the first called line is to be connected to conference line L10, one of the four-wire legs connected to conference bridge No. 1 (FIG. 6), ground applied to lead 633 from marker 517 will operate relay 6LH0 (FIG. 6). Relay 6LH0 upon operating locks through its 6LH0–1 make contact to ground on lead 534 of the link and connector circuit (FIG. 5) this path not being shown in detail but being indicated, as before, by dot-dash lines and brackets. Relay 6LH0, operated connects through its make contact 6LH0–2 (FIG. 7) battery to leads 737 (Destination Lamp) and 738 (Source Lamp); as indicated by the dot-dash lines and brackets, battery transmitted over these leads to the console circuit (FIG. 12) energizes the respective Destination and Source lamps associated with conference line L10 as a busy signal to the console. Also relay 6LH0 upon operating removes at its break contacts 6LH0–4 and 6LH0–5 (FIG. 6) termination resistors 641 and 642 from the respective receive and transmit sides of line L10. Ground is applied to lead 635 at this time from the link circuit in accordance with the normal operation of that circuit and this ground operates relay 6ID of the conference line circuit (FIG. 6). Relay 6CL0 has no circuit operating function but provides ground to indicate answer supervision to the connected line circuit. Amplifier 644 provides amplification in the transmit line to offset loss in the resistance bridge; similarly, amplifiers are provided in the other conference lines.

The above procedure is followed for the other conference lines until the required number have been connected (up to the limit of five of course) after which the conversations may proceed. A second conference can of course be set up in a similar way through the second conference line circuit and conference bridge No. 2.

*Conference Line Circuits Connected Together*

On occasion the attendant may be required to set up a conference for more than the five-line capacity of each conference bridge; in such event the novel arrangement contemplated by the present invention permits connection of the two bridges in tandem whereby to establish a conference with a capacity of ten lines. To initiate this connection the attendant selects either conference line circuit by operating the associated console pickup key. (Each conference bridge has a termination in the "source" or originating field of the console and each branch is terminated on separate keys in the "destination" or terminating field.) Assuming that conference line No. 1 has been selected ground will be connected to lead 710 (FIG. 7) from the attendant's position and console circuit in the same manner previously described in reference to lead 398 (FIGS. 12 and 10); this ground will operate relay 7CAC, (FIG. 7). Relay 7CAC, operated, splits at its break contacts 7CAC–1, 7CAC–2, 7CAC–3 and 7CAC–4 the transmit leads 718 and 719 and the receive leads 714 and 715 which leads, as indicated by the dot-dash lines and brackets are connected through the line pickup circuit to the attendant's position circuit. Relay 7CAC, operated, also completes at its 7CAC–5 make contact an operate path for relay 7AC1 (FIG. 7) which operates and removes at its 7AC1–1 and 7AC1–2 break contacts idle circuit terminating resistors 716 and 717 from the respective receive and transmit lines. Also 7AC1 relay upon operating completes at its 7AC1–3 make contact a path for operating relay 6ID (FIG. 6).

The attendant now closes conference Group Key 1383 (FIG. 13) which closes a path for operating relay 13PH from ground, make contact 10CK–2 of relay 10CK, closed Conference Group Key 1383, break contact 13PH–2 and winding of relay 13PH to battery; relay 13PH, operated, applies ground to lead 721 (FIG. 7) which operates relay 7TB through break contact 7ON–1 of relay 7ON. (Lead 721 for this circuit corresponds to lead 394, FIG. 12 of previously-described circuits and the ground is applied through a make contact corresponding to make contact 13PH-3.) The ground applied to lead 721 is also extended over lead 720 to the second conference line circuit where it operates a relay corresponding to relay 7TB of the first circuit.

Relay 7TB upon operating locks to ground through its own make contact 7TB-1 and break contacts 7RLS-1 of relay 7RLS and 7ON-2 of relay 7ON. Relay 7TB, operated, connects ground through its make contact 7TB-2 to lines 773 and 774 and also applies battery through its 7TB-3 make contact (FIG. 13) to light Conference Grouping lamps 1377 and 1378 as a signal to the console that the conference line circuits are grouped. Relay 7TB upon operating also closes at its 7TB-4 and 7TB-5 make contacts (FIG. 7) respective transmission lines 715 and 719. Relay 7TC has no circuit operating function but supplies ground to indicate answered supervision to the connected line circuit.

As the extension lines are connected to these conference line circuits as described above, relay 7ON (FIG. 7) will operate through the respective operated 6LH relay; assuming line L10 and relay 6LH0 are involved, the operating path for relay 7ON is traced from ground on lead 773 (through make contact 7TB-2 of relay 7TB), make contact 6LHO-6 of relay 6LHO, make contact 7TB-6 of relay 7TB, break contact 7ON-3 of relay 7ON, winding of relay 7ON to battery; relay 7ON operates and locks to ground through its own make contact 7ON-4 and make contact 7TB-7 of relay 7TB. While relay 7ON upon operating opens at its 7ON-1 break contact the operating path for relay 7TB, it completes at the same time a holding path for the relay through make contact 7TB-1 of relay 7TB, break contact 7RLS-1 of relay 7RLS, make contact 7ON-5 of relay 7ON to the ground on lead 773 through make contact 6LH0-6 of relay 6LH0.

Having set up the requested conference loop the attendant now disconnects the position and console circuits in the normal manner; this action removes ground from lead 710 and releases relay 7CAC (FIG. 7). Relay 7CAC, released, releases in turn relay 7AC1. When relay 7CAC releases transmission lines 714, 715, 718 and 719 are cut through at break contacts 7CAC-1, 7CAC-2, 7CAC-3 and 7CAC-4 whereby to establish a direct tandem connection of the two conference line circuits and attainment of a single conference loop with a ten line capacity.

It will be understood, of course, that in the above-described situation the attendant may have initiated the grouping by first selecting the second conference line circuit instead of the first. In general the operation would have been the same; application of ground to lead 712 (FIG. 7) is followed by operation of relay 7CAC1 which corresponds to relay 7CAC of the first conference line circuit.

*Stations Disconnect From Grouped Conference Lines*

The stations may, of course, go on-hook and release from the conference loop at respectively different times or all may release practically simultaneously. The novel arrangement contemplated by our invention is such that upon disconnect of all the lines connected to either conference bridge the tandem connection of the two bridges is automatically interrupted and the two bridges are restored to respectively independent status.

When a station goes on-hook and the line circuit disconnects from the grouped conference lines, the respective 6LH relay, for example the 6LH0, releases as ground on the respective link circuit lead, as lead 633 is removed. Release of the 6LH0 relay (taken as representative) removes at its 6LH0-2 and 6LH0-3 make contacts (FIG. 7) one source of battery from the DK and DL leads to the console circuit, and restores (at 6LH0-5 break contact) the idle circuit termination resistor across the transmit line. It will be assumed, for purposes of further description, that all five lines connected to conference bridge No. 1 have gone on-hook in which event relays 6LH0 to 6LH4 inclusive will release; this interrupts at the parallel-connected make contacts 6LH0-6 of relay 6LH0, 6LH4-1 of relay 6LH4, and the corresponding contacts of relays 6LH1, 6LH2 and 6LH3 (not shown), the locking path of relay 7TB to the ground on lead 773. Relay 7TB, released, removes at its make contact 7TB-7 the holding path for relay 7ON, which releases, and removes at its make contact 7TB-3 (FIG. 13) the energizing battery for Conference Grouping lamps 1377 and 1378 which go "dark." (Also when all 6LH relays released all battery was removed from the Destination and Source lamps). Relay 7TB, released, also reconnected at its break contacts 7TB-8 and 7TB-9 idle circuit termination resistors 716 and 717 across the respective lines and the circuit is now in normal condition.

The above-described grouping arrangement is particularly advantageous since it provides, on occasion, a conference loop of relatively large capacity and yet assures automatic restoration of the respective bridges to indepedent status immediately upon either bridge becoming "free" of connected lines; this being accomplished without monitoring on the part of the attendant.

*Released by Attendant of Grouped Conference Line Circuits*

In some instances the attendant may find it desirable to release the grouped conference line circuits either before or after having connected lines to the conference. The attendant selects either circuit (let us assume the first conference line circuit) in the manner described above after which she operates the Link Release Key (FIG. 13) to close contact 1391 thereof. Ground from make contact 13TM-1 of relay 13TM is applied through make contact 1391 of the Link Release Switch to leads 711 and 713 (FIG. 7), these leads corresponding in the conference line circuits to lead 393 (FIGS. 12 and 10) of other circuits previously described above. The respective paths are indicated by the dot-dash lines and brackets. This ground operates relay 7RLS (FIG. 7) through make contact 61D-1 of relay 61D as well as the corresponding release relay of the second conference line circuit.

Relay 7RLS, operated, releases relay 7TB by opening the holding path at break contact 7RLS-1; relay 7TB released removes at its make contact 7TB2 ground from lead 774 whereby to release the corresponding relay of the second conference line circuit.

Relay 7TB, released, opens at its make contact 7TB-3 (FIG. 13) the energizing path for Conference Grouping lamps 1377 and 1378 and the lamps go "dark"; opens at its make contacts 7TB-4 and 7TB-5 the transmission paths over leads 719 and 715 between the two conference line circuits, and reconnects at its break contacts 7TB-8 and 7TB-9 the idle circuit termination resistors 716 and 717 across the two lines.

While the Link Release key remains in closed position a path is completed through its make contact 1301 for lighting Link Release lamps 1302 and 1303.

Relay 7RLS releases when the Link Release key (FIG. 13) is restored to normal and ground is removed from leads 711 and 713 (FIG. 7). The circuits are now in normal condition.

*Connected Circuit Identification*

In accordance with the novel arrangement disclosed, identification of connected circuits, including conference connected lines, is automatic. Whenever the attendant's position and console circuits are connected to a particular line circuit the 4AC relay of that line circuit is operated and the pickup lamp corresponding to the line circuit is lighted at the console. Operation of the respective 4AC relay applies ground through either the operated 3RV or 4LS1 relay to the Identification lead toward the Link and Connector circuit. For a specific disclosure of this connection in reference to FIG. 4, ground is connected through make contact 4AC–4 of relay 4AC, and through either make contact 4LS1–5 of relay 4LS1 or 3RV–5 of relay 3RV whichever is then operated by existing circuit conditions, to identification lead 498 toward the Link and Connector circuit (FIG. 5). This ground is extended over the identification lead to the connected (called) line circuit where it operates the Identification (4L1D relay). Returning for the moment to FIG. 4 and assuming now for purposes of further description that this is the called line circuit, the ground incoming over identification lead 498 will operate relay 4L1D through either make contact 4LS1–5 of relay 4LS1 or 3RV–5 of relay 3RV. Relay 4L1D, operated, connects ground to the corresponding Pickup lamp of the Console circuit (in a specific example, previously described, ground is connected through make contact 4L1D–3 of relay 4L1D (FIG. 4), to lead 412 and thereover to Pickup lamp 1213 (FIG. 12), of the console circuit). Two pickup lamps are lighted at the console, therefore, the pickup lamp of the originating line and the pickup lamp of the called line. In order to attain identification of connected lines therefore, it is merely necessary for the attendant to "select" either of the lines in the usual manner. In the event the line selected by the attendant should be connected to a conference bridge then the Pickup lamps for all the other lines connected to the bridge in addition to the lamp of the selected line will light in the same manner described above. During this connection, it will be noted that the attendant's position circuit normally remains in the monitoring position, that is, transmitter battery is not connected to her telephone set (FIG. 12) since the Talk Switch has not been closed and relay 13TM (FIG. 13) is in relesed position. This condition prevents the attendant from interfering with the existing connections.

When the attendant disconnects the console circuit the Pickup lamps for the selected line and connected lines will go dark since the corresponding 4L1D relays will release following release of the respective 4AC relays.

*Rering Against Off-Hook*

During an established connection it may become necessary for the attendant to signal the originating station which, of course, is off-hook. In such event, the ground is momentarily removed by the attendant's position circuit from lead 311 (FIG. 3) releasing relay 2APL which, in turn, releases relay 2APL1. (Relay 2APL2 remains operated on the locking path through its own make contact 2APL2–2 and make contact 2L1–2 of relay 2L1.) When ground is restored on lead 311, relay 2APL reoperates but relay 2APL1 remains in released position since its operate path is open at break contact 2APL2–1 of relay 2APL2. A circuit for operating relay 2RR (FIG. 2) is now completed from battery, winding of relay 2RR, make contact 2APL–2 of relay 2APL, break contact 2APL1–2 of relay 2APL1, make contact 2APL2–3 of relay 2APL2, interrupter contact INT–3 to ground. When the interrupter contacts close, relay 2RR operates and locks through its make contact 2RR–1. Relay 2RR, operated, also completes through its 2RR–2 make contact a path for reoperating relay 2APL1 and completes through its 2RR–3 make contact a path for operating relay 2SR. Relay 2SR, operated, connects audible tone from source 244 through make contact 2RR–4 of relay 2RR and its own make contact 2SR–1 to lead 257 of the station receiving loop and connects ground to lead 254 thereof through its make contact 2SR–2, and also connects audible tone from source 247 to the transmitting loop TT—TR through its make contacts 2SR–3 and 2SR–4. When the interrupter contact INT–3 opens, relays 2RR and 2SR release and the tone is removed. This rering may be reapplied as required under control of the attendant's position circuit.

*Outgoing Call Initiated by Another Line*

If a call to the illustrated line be initiated by another line, connection to the illustrated line is made over a link under control of the marker 517. The marker grounds lead 414 (FIG. 4) to operate relay 4LH through break contacts 4ATT–3 of relay 4ATT and 4L1D–11 of relay 4L1D. Relay 4LH, operated, connects ground through its make contact 4LH–3 to lead 422 to operate the line hold (5LHM0) magnet of the Link and Connector Circuit (FIG. 5). Also, relay 4LH, upon operating, completes a path for operating relay 3RV (FIG. 3), traced from ground, make contact 4LH–11 of relay 4LH, break contacts 4ATT–6 of relay 4ATT, 3LL1–8 of relay 3LL1, 4L1D–12 of relay 4L1D, make contact 4LH–9 of relay 4LH, winding of relay 3RV to battery, and, further, connects battery to lead 461 through its make contact 4LH-10 (FIG. 4) for lighting Destination lamp 1262 (FIG. 12) "steady" at the console.

Relay 3RV, upon operating, locks to ground through its own make contact 3RV–6 and make contact 4LH–11 of relay 4LH and reverses at its make contacts 3RV–7, 3RV–8, 3RV–9 and 3RV–10 and break contcats 3RV–11, 3RV–12, 3RV–13 and 3RV–14 (FIG. 4) the transmit and receive pairs of the four-wire line for talking. Also relay 3RV, operated, disconnects at its respective break contacts 3RV–4 and 3RV–1 (FIG. 3) relays 3S and 3LL from the transmission path simplexes and extends through its make contacts RV–15 and 3RV–16 supervision leads 311 and 253 to the calling line over the simplexes since all supervision is vested in the calling line circuit.

With relay 3RV operated ground is extended over the simplex from the originating line circuit to lead 311 operating relay 2APL and causing the auxiliary line circuit (FIG. 2) to function as previously described. A path is provided through varistor 310 to lock relay 3RV to the ground on lead 253 when the called party answers whereby to prevent the called line from originating a spurious call in the event the calling party disconnects first. The same ground is extended over the simplex path to the originating line as an answered supervision signal.

*Holding Originating Line*

During the course of setting up a connection it may become desirable for the attendant to "hold" the originating line. In this event, she operates Hold Key 1384 (FIG. 13) which closes a path for operating relay 13PH from ground, make contact 13TM–1 of relay 13TM. (Talk Key 1382 being closed and relay 13TM operated), closed contact of key 1384, break contact 13PH–2 and winding of relay 13PH to battery. Relay 13PH, operated, completes at its 13PH–4 make contact an energizing path for Hold lamps 1307 and 1308 at the console, and connects through its 13PH–3 make contact (FIG. 12) ground to lead 394 which operates relay 4H (FIG. 4) through break contact 4H–4 thereof.

Relay 4H, operated, locks to ground through its own 4H–5 make contact and make contacts 4AC–9 of relay 4AC and 3LL1–5 of relay 3LL1, connects ground through its make contact 4H–6 to line 311 (FIG. 3) whereby to retain answered supervision in the connected auxiliary line circuit, and, following release of relay 4L1D upon release of the console circuit, connects interrupted battery through its make contact 4H–7 and interrupter contact INT–2, break contact 4LH–8 of relay 4LH and 4L1D–10 of relay 4L1D to line 412 and thereover to the console for flashing Pickup lamp 1213 at 30 i.p.m. as a signal to the attendant.

Operation of Hold Key 1384 at the console as described above was effective to disconnect the attendant's position and console circuits since operation of relay 13PH (FIG. 13) completed at its 13PH–5 make contact a path for operating relay 13GS. Operation of relay 13GS in turn removed at its 13GS–2 break contact (FIG. 12) ground from lead 398. When ground is removed from lead 398, relay 4ACA (FIG. 4) operates from battery through resistor 448 and releases, at its 4ACA–3 break contact, relay 4AC. Relay 4ACA, operated, sets up through its 4ACA–4 make contact a shunt around make contact 4AC–9 of relay 4AC whereby to maintain the locking path for relay 4H after relay 4AC releases.

The Hold condition is now under control of the 3LL1 relay (FIG. 3) which, in turn, is under control of relay 3LL supervising the calling station line. If the calling station should now go "on-hook" relay 3LL, releasing, would release 3LL1 and all operated relays controlled thereby restoring the circuit to normal idle condition with all lamps extinguished.

If the attendant wishes to re-enter the "held" line she operates the Pickup key marked by the slow flashing Pickup lamp. Operation of the Pickup key grounds lead 398 (FIG. 12), by operations previously described above, which shunts the operate path of relay 4ACA (FIG. 4) which releases. Relay 4ACA released opens at its 4ACA–4 make contact the holding path of relay 4H which releases. Relay 4ACA released recloses at its 4ACA–3 break contact the operate path for relay 4AC, which reoperates.

Figure 10:
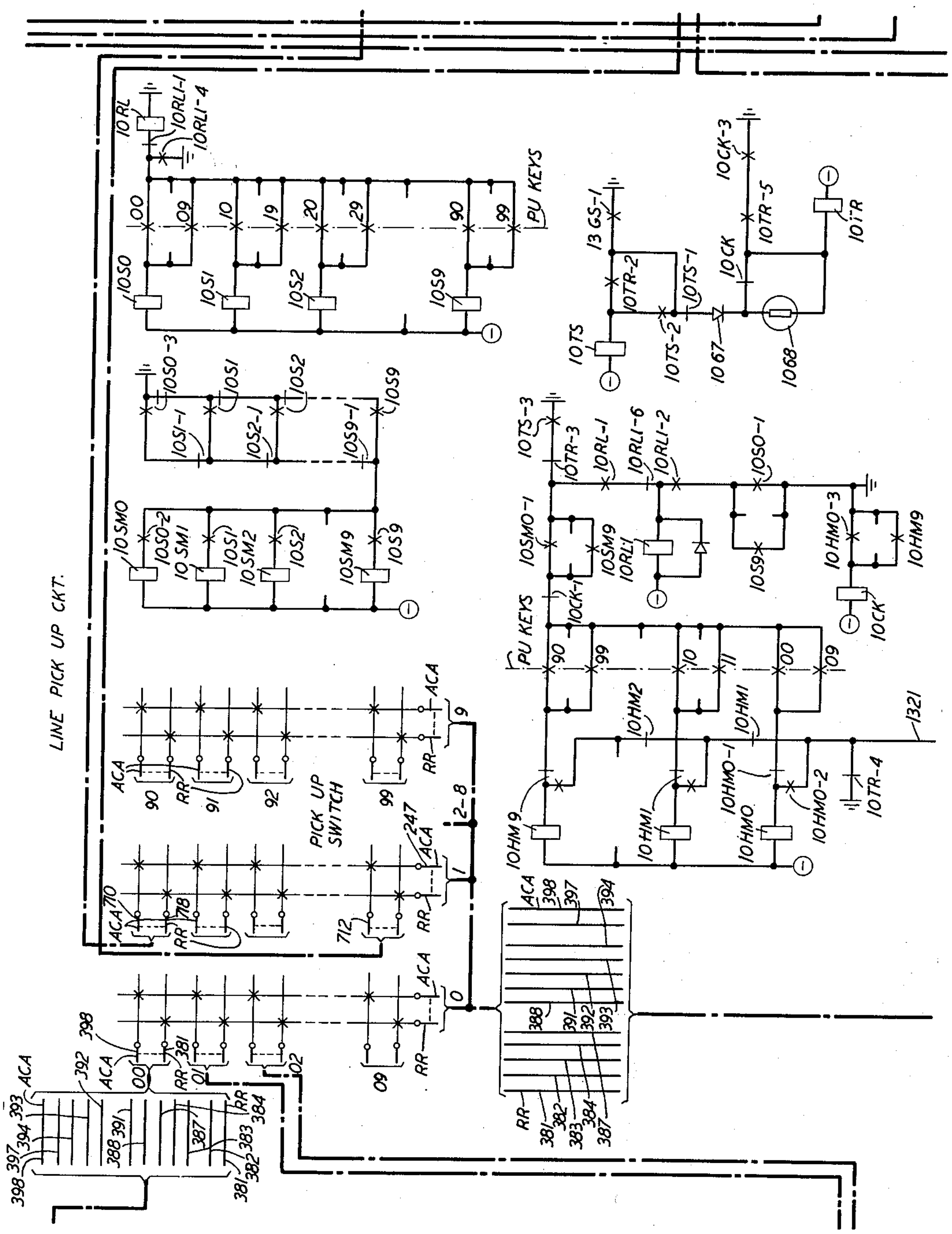
FIG. 10 shows the line pickup circuit.
Figure 11:
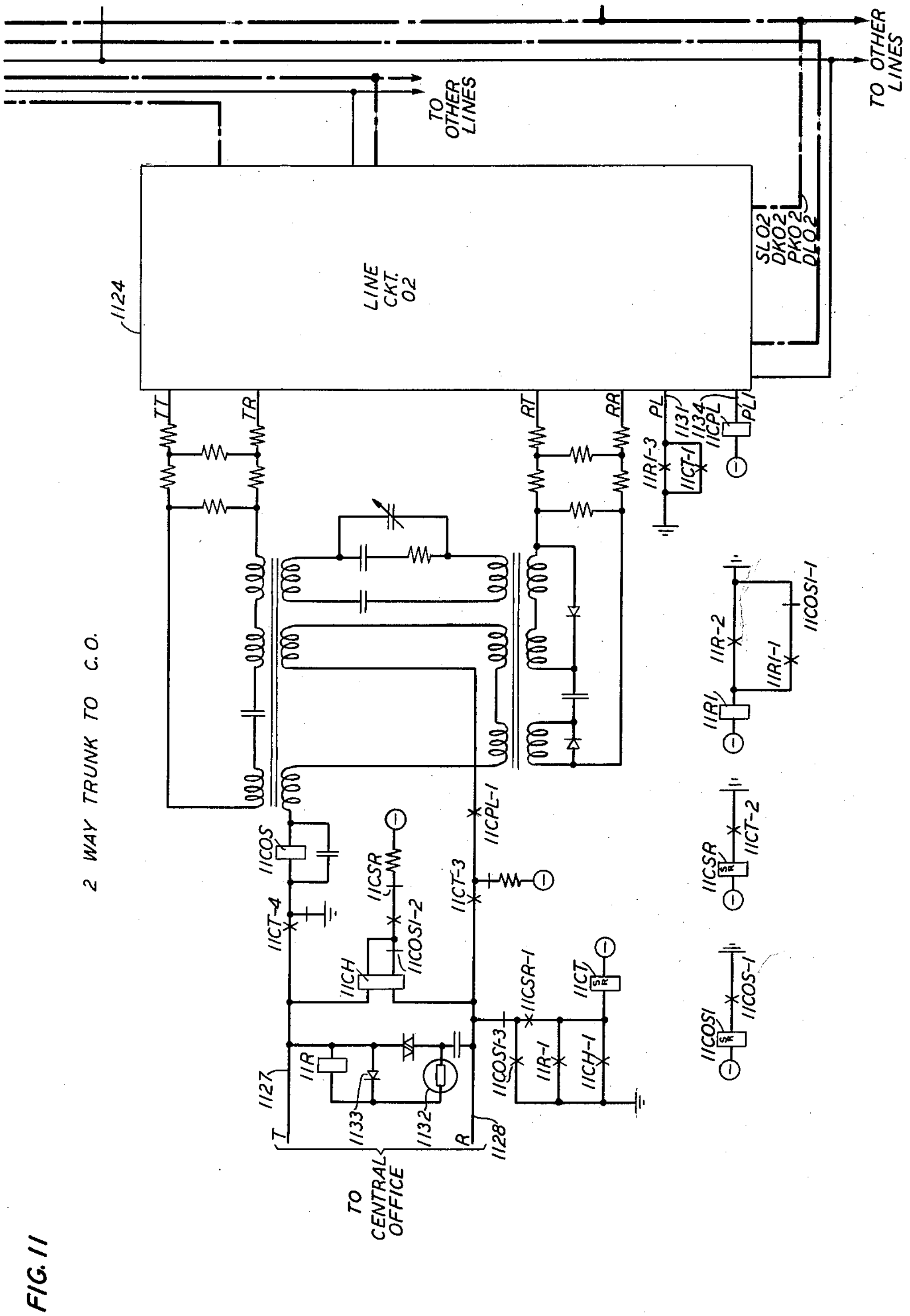
FIG. 11 shows the two-way, two-wire trunk circuit for connecting to a central office.

In the above-described operation the line pickup circuit was signaled to release the line circuit when Hold Switch 1384 was closed as described above. Relay 13PH upon operating locked through its 13PH–6 make contact (FIG. 13) over lead 1321 to ground on break contact 10TR–4, of relay 10TR (FIG. 10). When relay 13GS operated, following operation of relay 13PH, a path was completed for operation of relay 10TR (FIG. 10) from ground, make contact 13GS–1 of relay 13GS, break contact 10TS–1 of relay 10TS, diode 1067, thermistor 1068, winding of relay 10TR to battery. Relay 10TR, operating after a delay caused by thermistor 1068, locks to ground through its own make contact 10TR–5 and make contact 10CK–3 of relay 10CK; opens at its 10TR–3 break contact the operate path for the hold magnets; opens at its 10TR4 break contact the locking path for operated hold magnets; and also opens at its 10TR–4 break contact the holding path over lead 1321 for relay 13PH (FIG. 13) of the console circuit; completes at its make contact 10TR–6 an energizing path for Position Release lamps 1322 and 1323 (FIG. 13) of the console; and completes through its make contact 10TR–2 (FIG. 10) a path for operating relay 10TS.

Relay 13PH, upon releasing, interrupts at its 13PH–4 make contact the energizing path for Hold lamps 1307 and 1308 (FIG. 13) of the console, which go dark. Relays 10TS, operated, opens at its 10TS–1 break contact the operate path of relay 10TR and locks to ground through its 10TS–2 make contact and make contact 13GS–1 of relay 13GS. The hold magnets, released, open the crosspoints of the switch and release relay 10CK. Relay 10CK, released, opens at its 10CK–3 make contact the holding path of relay 10TR which releases. Relay 13GS, releasing following release of relay 13PH (FIG. 13) interrupted at its 13GS–1 make contact (FIG. 10) the holding path of relay 10TS which releases. Position Release lamps 1322 and 1323 went "dark" upon the release of relay 10TR.

*Two-Way Trunk to Central Office*

In addition to calls established to and from four-wire extension stations through a four-wire auxiliary line circuit (FIG. 2) as described above, connections may be made over a two-way trunk (FIG. 11) between the PBX and a central office. It will be understood that line circuit 02, not shown in detail but indicated by captioned rectangle 1124, is similar to the line circuit described above (FIGS. 3 and 4) and that many of the circuit operations involved in the present instance are the same as those described in detail above. As shown, a suitable repeat coil-network arrangement is provided in order to convert the two-wire (T-R) central office line to the four-wire (TT—TR and RT—RR) line required for compatibility with the PBX circuits.

Assuming first that the circuit is seized during a "silent" (nonring) interval, central office battery on tip and ring leads 1127 and 1128, respectively, operates relay 11CH; relay 11CH, operated, completes through its 11CH–1 make contact an operate path for relay 11CT. Relay 11CT, operated, connects ground through its 11CT–1 make contact to lead 1131 toward the line circuit 1124 whereby to signal the PBX. (Lead 1131 corresponds in general to lead 253, FIGS. 2 and 3, of the circuits described above.)

If the circuit is seized during a "ringing" interval, the central office ringing current will operate relay 11R; thermistor 1132 included in the ringing circuit prevents operation of relay 11R on short surges of current resulting, for example, from "disconnects" while diode 1133 provides a shunting path on one-half of each ringing cycle so that relay 11R operates on every other half cycle. Relay 11R, operated, closes at its 11R–1 make contact an operating path for relay 11CT, and closes at its 11R–2 make contact an operating path for relay 11R1; relay 11R1, upon operating, locks to ground through its own make contact 11R1–1 and break contact 11COS1–1 of relay 11COS1. (It is necessary to provide a locking path for relay 11R1 since relay 11R will release at the end of the ringing period releasing, in turn relay 11CT.)

Ground is now applied through make contact 11CT–1 of relay 11CT and/or make contact 11R1–3 of relay 11R1 to lead 1131 toward the line circuit 1124 whereby to signal the PBX as above described. Relay 11CH will operate during the silent interval, reoperating relay 11CT if it has released. (Relay 11CT is inherently slow-to-release.) Relay 11CT, operated, completes at its 11CT–2 make contact an operating path for relay 11CSR.

When the PBX responds to the call, ground is applied to lead 1134 in the manner described above, which ground operates relay 11CPL. Relay 11CPL, operated, closes the tip and ring leads 1127 and 1128 through its own make contact 11CPL–1, make contacts 11CT–3 and 11CT–4 of relay 11CT and the winding of relay 11COS as a signal to the central office. Central office battery on this closed loop operates relay 11COS which, in turn, closes at its 11COS–1 make contact a path for operating relay 11COS1.

Relay 11COS1, operated, interrupts at its 11COS1–1 break contact the holding path for relay 11R1, which if in operated position now releases. Also, relay 11COS1 upon operating interrupts at its 11COS1–2 break contact the operating path of relay 11CH, which releases, and establishes through its make contact 11COS1–3 and make contact 11CSR–1 of relay 11CSR a holding path for relay 11CT whereby to maintain a signal to the PBX. The circuit is now in condition for conversation.

In general, the circuit operates for other types of calls, and for disconnect, recall and other functions in a manner similar to that described above in connection with the four-wire auxiliary line circuit.

*Carrier Facilities With E and M Lead Signaling*

On occasion a connection may be established from a four-wire extension station to the PBX through carrier facilities including E and M lead signaling. In such event an auxiliary line circuit of the type shown in FIGS. 8 and 9 may be utilized. Since carrier facilities suitable for the purpose are well known in the art, and since the exact arrangement thereof is not essential for the present purposes, such facilities will not be described in detail but are indicated by the captioned rectangle 353.

Figure 8:
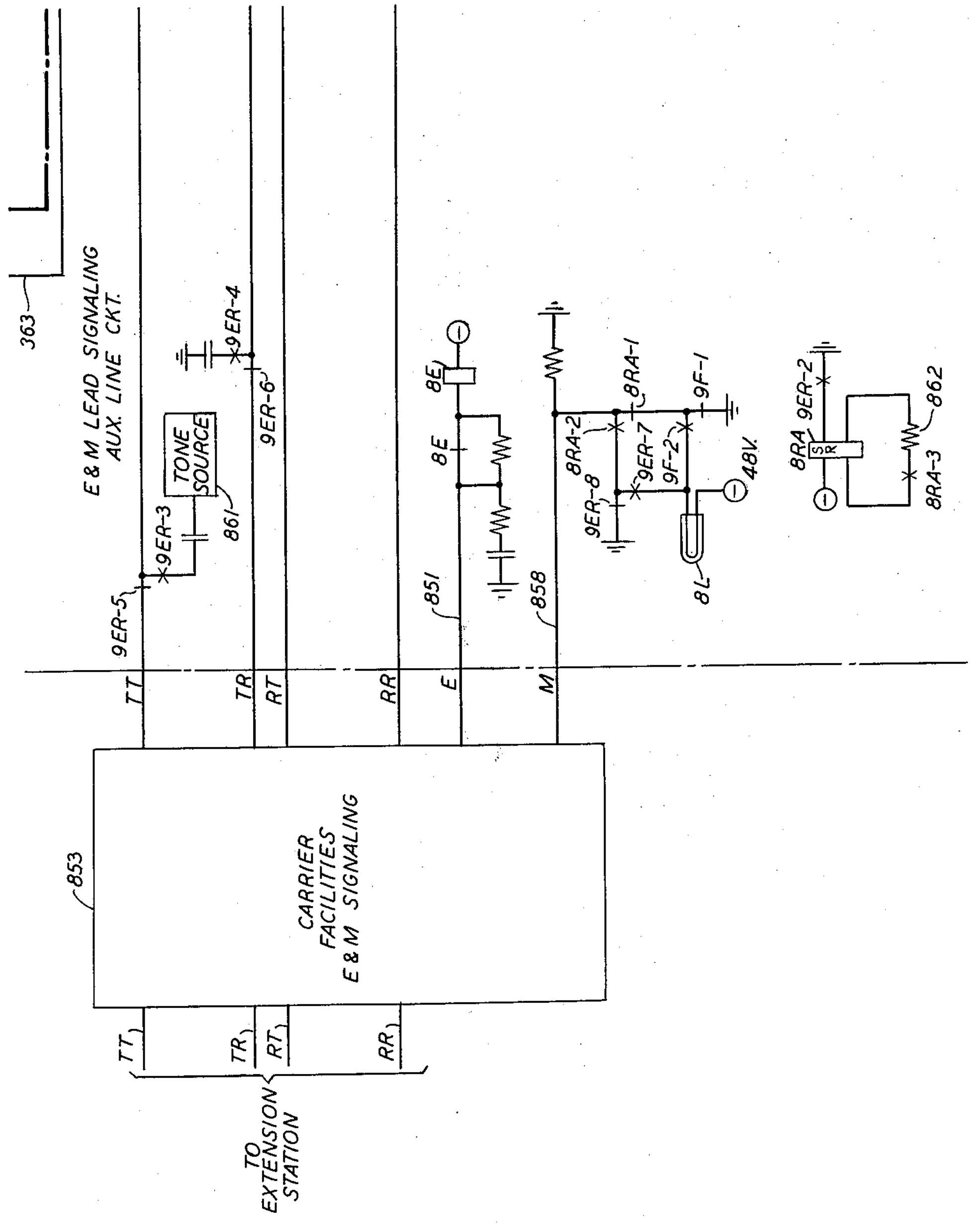
FIGS. 8 and 9 show the auxiliary line circuit used with E and M lead signaling.
Figure 9:
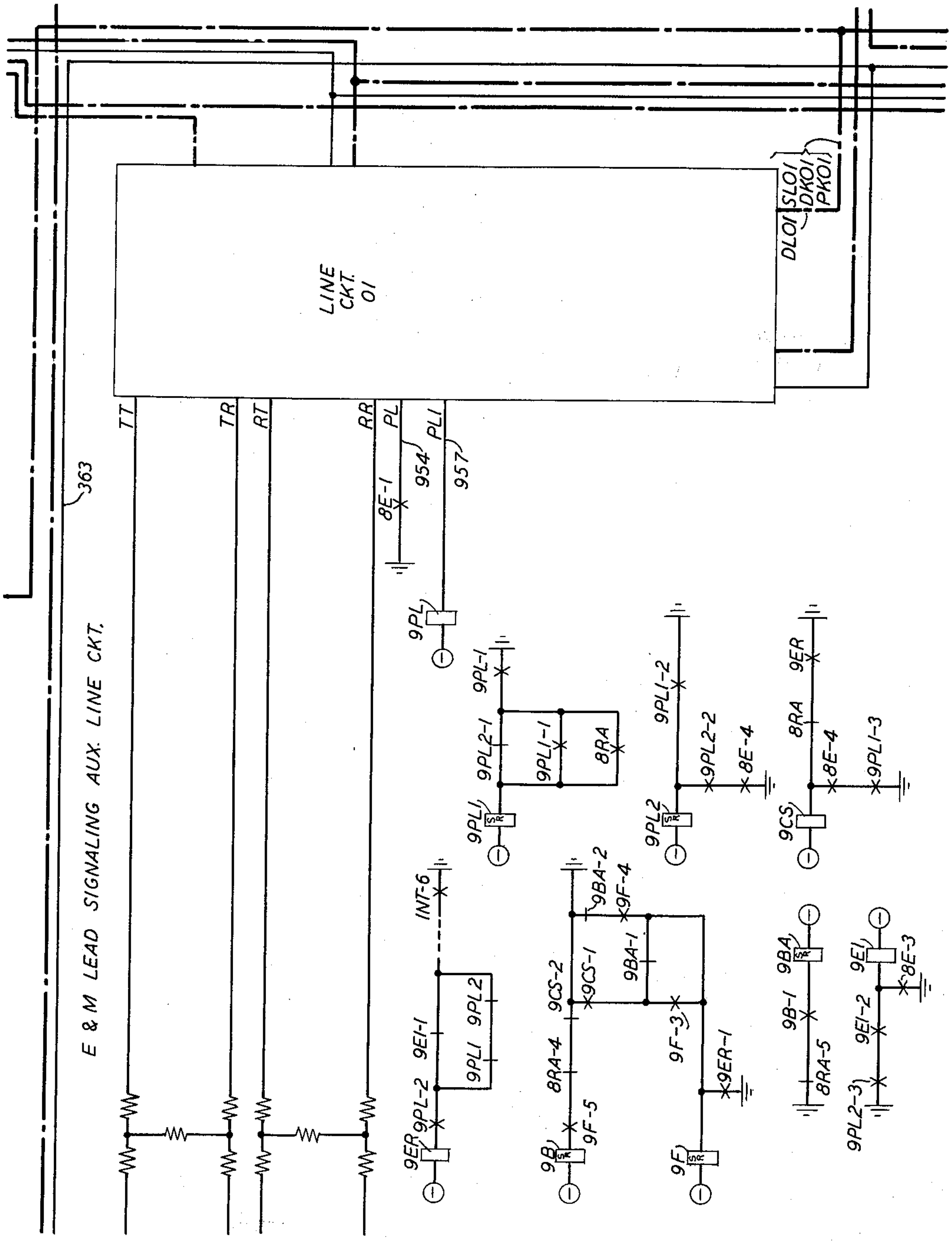

Referring to FIGS. 8 and 9, when the four-wire extension station originates a call by going off-hook ground is applied to the "E" lead 851 by operations inherent in the carrier facilities 853; this ground operates relay 8E. Relay 8E, operated, connects ground through its make contact 8E–1 (FIG. 9) to lead 954 as an off-hook signal to line circuit 01, which is similar to the line circuit of FIGS. 3 and 4 described in detail above. Also, relay 8E, upon operating, completes through its 8E–3 make contact an operating path for relay 9E1, and partially completes at its 8E–4 make contact an operating path for relay 9CS. Relay 9E1 upon operating opens at its 9E1–1 break contact the operating path of relay 9ER whereby to prevent operation of that relay when relay 9PL operates.

When the "answer" signal from the PBX is indicated by the connection of ground over lead 957 from the line circuit, relay 9PL operates. Relay 9PL1 operates, following operation of relay 9PL, over a path from battery, winding of relay 9PL1, break contact 9PL2–1 of relay 9PL2, make contact 9PL–1 of relay 9PL to ground. Relay 9PL1, upon operating, completes an alternate holding path by way of its 9PL1–1 make contact, completes through its 9PL1–2 make contact an operate path for relay 9PL2 and completes through its make contact 9PL1–3 and make contact 8E–4 of relay 8E an operate path for relay 9CS. Relay 9PL2, upon operating, locks to ground through its own make contact 9PL2–2 and make contact 8E–4 of relay 8E. Relay 9CS, operated, completes an operate path for relay 9F from ground, make contact 9CS–1 of relay 9CS, break contact 9BA–1 of relay 9BA, winding of relay 9F to battery. Relay 9F, upon operating, disconnects at its 9F–1 break contact (FIG. 8) ground from the M lead 858 and connects battery thereto through its 9F–2 make contact and break contact 8RA–1 of relay 8RA as an off-hook signal to the carrier facilities.

Assume now that a call originates through the PBX which is destined for an extension station reached through the auxiliary line circuit of FIGS. 8 and 9. In this instance ground is applied to lead 957 through the line circuit 01 and relay 9PL operates. Relay 9PL1 operates, following operation of relay 9PL, as described above, locks to ground, and operates relay 9PL2. Relay 9ER operates following operation of relay 9PL over a path from ground, interrupter contact INT–6, break contact 9E1–1 of relay 9E1, make contact 9PL–2 of relay 9PL, winding of relay 9ER to battery; this interrupter is arranged to close for one second and to open for three seconds of each cycle and relay 9ER operates during each "closed" interval.

Relay 9ER, operated, completes at its 9ER–1 make contact an operating path for relay 9F which operates and locks to ground through its own make contacts 9F–3 and 9F–4 and break contacts 9BA–1 and 9BA–2 of relay 9BA. Also, relay 9ER upon operating completes through its make contact 9ER–2 an operate path for relay 8RA (FIG. 8), connects through its 9ER–3 and 9ER–4 make contacts (FIG. 8) audible tone from source 861 to the TT—TR loop of the PBX and opens the loop toward the station at break contacts 9ER–5 and 9ER–6.

When interrupter contact INT–6 opens, relay 9ER releases and removes at its make contact 9ER–7 battery from the M lead 858 and connects ground thereto over its break contact 9ER–8 and make contact 8RA–2 of relay 8RA; relay 9ER, released, at this same time opens the operate path of relay 8RA the release of which, however, is retarded by the secondary winding short-circuited through its own make contact 8RA–3 and resistor 862. This delayed release of relay 8RA provides a timed ground impulse over lead 858 to the distant end. Upon release of relay 8RA, battery is again connected to lead 858 through make contact 9F–2 of relay 9F and break contact 8RA–1 of relay 8RA.

Relay 8RA, released, closes a path for operating relay 9B (FIG. 9) from ground, break contacts 9CS–2 of relay 9CS and 8RA–4 of relay 8RA, make contact 9F–5 of relay 9F, winding of relay 9B to battery. Relay 9B, operated, operates relay 9BA through its make contact 9B–1 and break contact 8RA–5 of relay 8RA; relay 9BA operated, opens at its 9BA–2 and 9BA–1 break contacts the holding path of relay 9F which releases. Relay 9F, released, releases at its 9F–5 make contact relay 9B which, in turn, releases relay 9BA. Relay 9F, released, once again removes the battery from lead 858 and reconnects ground thereto as a signal to the distant end (make contact 9F–2 and break contact 9F–1). This completes one cycle, the sequence of which may continue until the distant end signals off-hook or the call is abandoned.

When the distant end signals "off-hook," ground on lead 851 operates relay 8E (FIG. 8) as described above. Relay 8E, operated, connects ground through its 8E–1 make contact (FIG. 9) to lead 954 as an off-hook signal to the PBX and also operates relay 9CS, if released, through its own make contact 8E–4 and make contact 9PL1–3 of relay 9PL1. Relay 9CS, operated, operates relay 9F, if released, through its own make contact 9CS–1 and break contact 9BA–1 of relay 9BA. Relay 9F, operated, connects battery through its 9F–2 make contact to the M lead 858 as an off-hook signal to the distant end. Relay 8E, operated, provides through its 8E–3 make contact an operate path for relay 9E1 which locks to ground through its own make contact 9E1–2 and make contact 9PL2–3 of relay 9PL2 whereby to assure that no signal will be sent to the distant end on disconnect. Relay 9E1, operated, also opens at its 9E1–1 break contact the operate path of relay 9ER. This circuit is now in condition for conversation.

Other operations and functions of the circuit are similar in general to those described above in connection with the four-wire auxiliary line circuit of FIG. 2.

While a specific embodiment of the invention has been selected for detailed disclosure, the invention is not, of course, limited in its application to the embodiment disclosed. For example, more than two conference bridges may be provided for connection on occasion in tandem and the number of conference lines connected to each bridge may be different than that disclosed. In short, the embodiment which has been described should be taken as illustrative rather than restrictive thereof.

What is claimed is:

1. In a telephone system, a private branch exchange, an attendant's position at said private branch exchange, a plurality of station lines, a first conference bridge and a second conference bridge, both of said conference bridges being at said same private branch exchange and each of said conference bridges having a plurality of conference lines connected thereto, means under control of said attendant's position for connecting selected ones of said station lines to selected ones of said conference lines connected to said first conference bridge except for an exclusive one of said conference lines and for connecting other selected ones of said station lines to selected ones of said conference lines connected to said second conference bridge except for an exclusive one of said conference lines, and means also under control of said attendant's position for connecting said exclusive ones of said conference lines together to connect said conference bridges in tandem whereby to provide a single conference loop of relatively large capacity.

2. In a telephone system, a private branch exchange, an attendant's position at said private branch exchange, a plurality of lines, a first conference bridge and a second conference bridge at said private branch exchange, each of said conference bridges having a plurality of conference legs connected thereto, means under control of said attendant's position for connecting selected ones of said lines to selected ones of said conference legs connected to said first conference bridge and for connecting other selected ones of said lines to selected ones of said conference legs connected to said second conference bridge, means to connect said first and said second conference bridges in tandem whereby all of said selected lines are connected in a common conference circuit, and means effective upon disconnection from either respective conference bridge of all the lines connected thereto to interrupt said tandem connection and restore the respective bridges to independent status.

3. In a telephone system, a private branch exchange, an attendant's position at said private branch exchange, a plurality of four-wire station lines, a plurality of four-wire conference lines at said private branch exchange, means for interconnecting said conference lines including two balanced resistance bridges, both of said resistance bridges being at said same private branch exchange and each having a plurality of four-wire legs, means for connecting each of said conference lines to a respective one of said legs, each of said resistance bridges being so arranged that a relatively low-loss path is provided between the input side of each connected conference line and the respective output sides of the other conference lines connected to the same resistance bridge and that a relatively high-loss path is provided between the input side of each connected conference line and the output side of the same respective line, means under control of said attendant's position for connecting selected ones of said station lines to selected ones of said conference lines connected to each of said bridges whereby to set up two conference loops, and additional means under control of said attendant's position for connecting a respective four-wire leg of the first resistance bridge and a respective four-wire leg of the second resistance bridge whereby to connect said bridges in tandem and provide a single conference loop of relatively large capacity.

4. In a telephone system, the combination defined by claim 3 further characterized in means effective upon all of the station lines connected to either of said resistance bridges going on-hook to interrupt the tandem connection of said resistance bridges whereby to restore the bridges to independent status.

5. In a telephone system, a private branch exchange, an attendant's position at said private branch exchange, a plurality of four-wire station lines, a first balanced resistance bridge and a second balanced resistance bridge, both of said resistance bridges being at said same private branch exchange, each of said bridges including six four-wire branches interconnected by the respective bridge, a first group of five coference lines connected respectively to the first five branches of said first bridge, a second group of five conference lines connected respectively to the first five branches of said second bridge, means under control of said attendant's position for connecting selected ones of said station lines to selected ones of said first group of conference lines and for connecting other selected ones of said station lines to selected ones of said second group of conference lines, and means for joining the sixth branch of the first bridge and the sixth branch of the second bridge whereby to connect the two bridges in tandem.

6. In a telephone system, the combination defined by claim 5 further characterized in that said last-mentioned means includes a relay and means controlled by said attendant's position for operating said relay.

7. In a telephone system, the combination defined by claim 6 further characterized in means effective to release said relay upon all of said station lines connected to either of said bridges going on-hook.

8. In a telephone system, the combination defined by claim 5 further characterized in that each of said bridges is so arranged that a relatively low-loss path is provided between the input of each branch and the output of each of the other branches connected to the respective bridge and that a relatively high-loss path is provided between the input of each branch and the output of the same branch.

References Cited in the file of this patent

UNITED STATES PATENTS

| | | |
|---|---|---|
| 2,303,015 | Beaumont | Nov. 24, 1942 |
| 2,365,996 | Bakker | Dec. 26, 1944 |
| 2,882,339 | Smee et al. | Apr. 14, 1959 |